US012728404B2

(12) United States Patent
Lambert et al.

(10) Patent No.: US 12,728,404 B2
(45) Date of Patent: Sep. 8, 2026

(54) OXYGEN-CARRIER SOLID WITH SUB-STOICHIOMETRIC SPINEL FOR A CHEMICAL-LOOPING REDOX PROCESS

(71) Applicants: IFP Energies nouvelles, Rueil-Malmaison (FR); TOTAL RAFFINAGE CHIMIE, Courbevoie (FR)

(72) Inventors: Arnold Lambert, Rueil-Malmaison (FR); Mathieu Michau, Rueil-Malmaison (FR)

(73) Assignees: IFP Energies nouvelles, Rueil-Malmaison (FR); TOTAL RAFFINAGE CHIMIE, Courbevoie (FR)

( * ) Notice: Subject to any disclaimer, the term of this patent is extended or adjusted under 35 U.S.C. 154(b) by 684 days.

(21) Appl. No.: 18/018,458

(22) PCT Filed: Jul. 21, 2021

(86) PCT No.: PCT/EP2021/070364

§ 371 (c)(1),
(2) Date: Jan. 27, 2023

(87) PCT Pub. No.: WO2022/023140

PCT Pub. Date: Feb. 3, 2022

(65) Prior Publication Data

US 2023/0415125 A1 Dec. 28, 2023

(30) Foreign Application Priority Data

Jul. 31, 2020 (FR) ....................................... 2008189

(51) Int. Cl.

| | |
|---|---|
| ***B01J 23/00*** | (2006.01) |
| ***B01J 23/78*** | (2006.01) |
| ***B01J 35/08*** | (2006.01) |
| ***B01J 35/10*** | (2006.01) |
| ***B01J 35/63*** | (2024.01) |
| ***B01J 35/69*** | (2024.01) |

(Continued)

(52) U.S. Cl.
CPC ............. *B01J 23/005* (2013.01); *B01J 23/78* (2013.01); *B01J 35/635* (2024.01); *B01J 35/638* (2024.01);
(Continued)

(58) Field of Classification Search
CPC . B01J 21/04; B01J 21/10; B01J 23/005; B01J 23/72
See application file for complete search history.

(56) References Cited

U.S. PATENT DOCUMENTS

| | | | | |
|---|---|---|---|---|
| 5,447,024 | A | 9/1995 | Ishida et al. | |
| 11,717,811 | B2 * | 8/2023 | Lambert | B01J 35/66 431/7 |

(Continued)

FOREIGN PATENT DOCUMENTS

| | | | | |
|---|---|---|---|---|
| CA | 2812031 A1 * | 3/2012 | | C10G 2/50 |
| CN | 1301803 A | 7/2001 | | |

(Continued)

OTHER PUBLICATIONS

Yuan, Effect of MgO loadings on the performance of Fe2O3/MgO/A12O3 oxygen carrier, Tianjin Chemical Industry, vol. 30, No. Mar. 2, 2016 (cited in an Search Report dated Jul. 21, 2021 in CN App. No. 2021800585615).

(Continued)

*Primary Examiner* — Jun Li

(74) *Attorney, Agent, or Firm* — FITCH, EVEN, TABIN & FLANNERY, LLP

(57) ABSTRACT

The present invention relates to an oxygen carrier solid, to the preparation thereof and to the use thereof in a chemical looping redox process such as chemical looping combustion (CLC). The solid in particulate form includes a total copper content (X) ranging from 5% to 39% expressed as CuO by weight relative to the total weight of the solid in its oxidized (Continued)

form, and a ceramic matrix within which said copper is dispersed, the matrix including a first sub-stoichiometric spinel of formula $Mg_aAl_bO_4$, and/or a second sub-stoichiometric spinel of formula $Cu_cMg_dAl_eO_4$. The carrier solid includes an amount Y of MgO as a weight percentage of the oxygen carrier solid of between 1% and 23%, and Y<−0.6342X+26.223.

16 Claims, 10 Drawing Sheets

(51) Int. Cl.
*B01J 37/00* (2006.01)
*B01J 37/02* (2006.01)
*B01J 37/08* (2006.01)

(52) U.S. Cl.
CPC .......... *B01J 35/69* (2024.01); *B01J 37/0045* (2013.01); *B01J 37/0205* (2013.01); *B01J 37/088* (2013.01)

(56) References Cited

U.S. PATENT DOCUMENTS

| | | | | |
|---|---|---|---|---|
| 2009/0061254 | A1* | 3/2009 | Goela | C23C 16/403 204/192.15 |
| 2019/0388874 | A1 | 12/2019 | Lambert et al. | |

FOREIGN PATENT DOCUMENTS

| | | | | |
|---|---|---|---|---|
| CN | 110225795 | A | 9/2019 | |
| FR | 2937030 | A1 | 4/2010 | |
| FR | 3061036 | A1 | 6/2018 | |
| WO | WO-02079090 | A1 * | 10/2002 | C01F 7/162 |
| WO | 2006/123925 | A1 | 11/2006 | |
| WO | 2010/040916 | A1 | 4/2010 | |
| WO | 2012/155059 | A1 | 11/2012 | |

OTHER PUBLICATIONS

Search Report dated Sep. 23, 2024 in CN App. No. 2021800585615.

Adanez et al. 2012: "Progress in Chemical Looping Combustion and Reforming Technologies", Progress in Energy and Combustion Science, 38(2), 2012, pp. 215-282 (cited in specification).

P. Knutsson and C. Linderholm, 2015 "Characterization of Ilmenite used as Oxygen Carrier in a 100 kW Chemical-Looping Combustor for Solid Fuels", Applied Energy 157, 2015, pp. 368-373 (cited in specification).

Abanades et al. 2015: "Emerging CO2 Capture Systems", Int. J. Greenhouse Gas Control 40, 2015, pp. 126-166 (cited in specification).

Wei et al. 2015 "Continuous Operation of a 10 kWth Chemical Looping Integrated Fluidized Bed Reactor for Gasifying Biomass Using an Iron-Based Oxygen Carrier". Energy Fuels 29, 2015, p. 233-241 (cited in specification).

Forero et al. 2011 "High temperature behaviour of a CuO/γ-Al2O3 oxygen carrier for chemical-looping combustion", Int. J. Greenhouse Gas Control, 5, 2011, pp. 659-667 (cited in specification).

Lambert et al. 2018 "Performance and degradation mechanisms of CLC particles produced by industrial methods", Fuel 216, 2018, p. 71 (cited in specification).

L.S. Fan et al. 2011 "Ionic diffusion in the oxidation of iron—effect of support and its implications to chemical looping applications", Energy Environ. Sci. 4, 2011, p. 876 (cited in specification).

Jerndal et al. 2010 "Investigation of NiO/NiAl2O4 oxygen carriers for chemical-looping combustion produced by spray- drying", International Journal of Greenhouse Gas Control, 4, 2010, p. 23 (cited in specification).

Linderholm et al. 2009 "Long-term integrity testing of spray-dried particles in a 10-kW chemical-looping combustor using natural gas as fuel", Fuel, 88(11), 2009, pp. 2083-2096 (cited in specification).

Gayân Pilar et al: "Effect of Support on the Behavior of Cu-Based Oxygen Carriers during Long-Term CLC Operation at Temperatures above 1073 K", Energy & Fuels vol. 25, No. 3, Mar. 17, 2011 (Mar. 17, 2011), pp. 1316-1326, XP055785722, Washington, DC, US. ISSN: 0887-0624, DOI: 10.1021/ef101583w https://pubs.acs.org/doi/pdf/10.1021/ef101583w (cited in ISR).

Arjmand Mehdi et al: "Oxygen Release and Oxidation Rates of MgAl 2 0 4 -Supported CuO Oxygen Carrier for Chemical-Looping Combustion with Oxygen Uncoupling (CLOU)", Energy & Fuels, vol. 26, No. 11, Oct. 18, 2012 (Oct. 18, 2012), pp. 6528-6539, XP055785777, Washington, DC, US. ISSN: 0887-0624, DOI: 10.1021/ef3010064 URL:https://pubs.acs.org/doi/pdf/10.1021/ef3010064 (cited in ISR).

* cited by examiner

OXYGEN-CARRIER SOLID WITH SUB-STOICHIOMETRIC SPINEL FOR A CHEMICAL-LOOPING REDOX PROCESS

CROSS-REFERENCE TO RELATED APPLICATIONS

This application is a U.S. national phase application filed under 35 U.S.C. § 371 of International Application No. PCT/EP2021/070364, filed Jul. 21, 2021, designating the United States, which claims priority from French Application No. 2008189, filed Jul. 31, 2020, which are incorporated herein by reference in their entireties.

TECHNICAL FIELD

The present invention relates to an oxygen carrier solid, to the preparation thereof and to the use thereof in a chemical looping redox process. In particular, the new type of oxygen carrier solid according to the invention may be used in what is commonly called a chemical looping combustion (CLC) process.

PRIOR ART

Chemical looping redox processes using an oxygen carrier solid are known in the field of power generation, gas turbines, boilers and furnaces, notably for the oil, glass and cement industries.

In particular, the production of electricity, heat, hydrogen or steam may be performed by this type of process, typically a CLC process, involving redox reactions of an oxygen carrier solid, typically a metal oxide supported on a ceramic, to produce a hot gas from a fuel, for example natural gas, carbon monoxide CO, hydrogen $H_2$, coals, petroleum residues or a mixture of hydrocarbons, and to isolate the carbon dioxide $CO_2$ produced. It may then be envisaged to store the captured $CO_2$ in geological formations, or to use it as a reagent in other processes, or alternatively to inject it into oil wells in order to increase the amount of hydrocarbons extracted from the deposits (enhanced oil recovery (EOR) and enhanced gas recovery (EGR)).

In such a chemical looping redox process, a first oxidation reaction of the oxygen carrier solid with air or another oxidizing gas, acting as an oxidizer, makes it possible, on account of the exothermic nature of the oxidation, to obtain a hot gas whose energy can then be exploited. When the oxidizing gas is water vapour, the oxidation of the oxygen carrier solid also produces a gaseous effluent rich in $H_2$. A second reduction reaction of the oxidized oxygen carrier solid with a reducing gas, liquid or solid (hydrocarbon feedstock) then makes it possible to obtain a reusable oxygen carrier solid along with a gaseous mixture essentially comprising $CO_2$ and water, or even synthesis gas containing CO and $H_2$, depending on the conditions applied during the reduction step.

In a CLC process, the energy may be produced in the form of steam or electricity, for example. The heat of combustion of the hydrocarbon feedstock is similar to that encountered in conventional combustion. This corresponds to the sum of the heats of reduction and of oxidation in the chemical looping. The heat is generally extracted by heat exchangers located inside, on the wall of or in the appendix of the fuel and/or air reactors, on the flue gas lines, or on the oxygen carrier solid transfer lines.

A major advantage of these CLC processes is that the $CO_2$ (or syngas) contained in the oxygen-free and nitrogen-free gas mixture constituting the effluent from the reduction reactor can be readily isolated.

Another advantage may be the production of a nitrogen $N_2$ (and argon) stream containing virtually no more oxygen, corresponding to the effluent obtained from the oxidation reactor, when air is used as the oxidizing gas.

In a context of increasing global energy demand, the CLC process thus provides an attractive solution for capturing $CO_2$ for the purpose of sequestering it or reusing it for other processes, so as to limit the emission of environmentally detrimental greenhouse gases.

For example, U.S. Pat. No. 5,447,024 describes a CLC process comprising a first reactor for reducing an oxygen carrier solid with a reducing gas and a second oxidation reactor for restoring the oxygen carrier solid to its oxidized state by an oxidation reaction with moist air. Circulating fluidized bed technology is used to allow the oxygen carrier solid to pass continuously from the reduction reactor to the oxidation reactor and vice versa.

Patent application WO 2006/123925 describes another implementation of the CLC process using one or more fixed bed reactors containing the oxygen carrier solid, with the redox cycles performed by gas permutation so as to successively perform the oxidation and reduction reactions of the oxygen carrier solid.

In the CLC process, the oxygen carrier solid, passing alternately from its oxidized form to its reduced form and vice versa, describes a redox cycle. The oxygen carrier solid thus acts as an oxygen carrier: it includes the metal oxide(s) that are capable of exchanging oxygen under the redox conditions of the CLC process.

It should be noted that, in general, the terms oxidation and reduction are used in relation to the oxidized or reduced state of the oxygen carrier solid, respectively. The oxidation reactor is the reactor in which the oxygen carrier solid is oxidized and the reduction reactor is the reactor in which it is reduced.

Thus, in the reduction reactor, the oxygen carrier solid, a metal oxide ($M_xO_y$), generally supported on a ceramic, M representing a metal, is first reduced to the state $M_xO_{y-2n-m/2}$, via a hydrocarbon $C_nH_m$, which is correlatively oxidized to $CO_2$ and $H_2O$, according to reaction (1), or possibly to a mixture of CO+$H_2$, depending on the nature of the oxygen carrier solid and of the proportions used.

$$C_nH_m + M_xO_y \rightarrow nCO_2 + m/2\ H_2O + M_xO_{y-2n-m/2} \quad (1)$$

In the oxidation reactor, the oxygen carrier solid is restored to its oxidized state ($M_xO_y$) in contact with an oxidizing gas, typically air, according to reaction (2), before returning to the first reactor.

$$M_xO_{y-2n-m/2} + (n + m/4)O_2 \rightarrow M_xO_y \quad (2)$$

In the case where the oxidation of the oxygen carrier solid is performed with steam, a hydrogen stream is obtained at the outlet of the oxidation reactor (reaction (3)).

$$M_xO_{y-2n-m/2} + (2n + m/2)H_2O \rightarrow M_xO_y + (2n + m/2)H_2 \quad (3)$$

The metal oxide is generally associated with a binder or a support, notably to ensure good reversibility of the oxidation and reduction reactions, and to improve the mechanical strength of the particles. Indeed, metal oxides, chosen, for example, from redox couples of copper, nickel, iron, manganese and/or cobalt, cannot be used pure because the successive high-temperature oxidation/reduction cycles result in a significant and rapid reduction in the oxygen transfer capacity, due to the sintering of the metal particles.

Thus, in U.S. Pat. No. 5,447,024, the oxygen carrier solid includes an NiO/Ni redox couple combined with a YSZ binder which is yttrium-stabilized zirconia, also known as yttriated zirconia.

Many types of binders and supports have been studied in the literature for the purpose of increasing the mechanical strength of the particles, at a lower cost than YSZ. Among these, mention may be made of alumina, metal aluminate spinels, titanium dioxide, silica, zirconia, ceria, kaolin, bentonite, etc.

The efficiency of the CLC process depends mainly on the physicochemical properties of the oxygen carrier solid. Indeed, in addition to the reactivity and oxygen transfer capacity of the oxygen carrier solid, which have an influence on reactor sizing and, in the case of circulating fluidized bed technology, the particle circulation rates, the lifetime of the particles in the process has a major impact on the running cost of the process, particularly in the case of the circulating fluidized bed process.

Specifically, in the case of the circulating fluidized bed process, the rate of attrition of the particles makes it necessary to compensate for the loss of oxygen carrier solid in the form of fines, typically particles of the oxygen carrier solid with a diameter of less than 40 μm, with fresh oxygen carrier solid. The rate of replacement of the oxygen carrier solid thus depends greatly on the mechanical strength of the particles and also on their chemical stability under the process conditions, which includes many successive oxidation/reduction cycles.

In general, the performance of the oxygen carrier solids reported in the literature is satisfactory in terms of oxygen transfer capacity and reactivity with the various hydrocarbons tested (cf. Adanez et al. 2012: "Progress in Chemical Looping Combustion and Reforming Technologies", Progress in Energy and Combustion Science, 38(2), 2012, pages 215-282).

However, in most publications, too short a test period and/or the lack of thorough characterization of the particles after the test do not make it possible to conclude as to the lifetime of the particles in the CLC process, although some authors announce significant lifetimes.

Thus, although many studies involving a metal oxide (usually CuO, NiO, CoO, $Fe_2O_3$ and/or $MnO_2$) on a support conclude that most of the formulations tested are suitable for the CLC process, the lifetime of the particles associated with the numerous redox cycles undergone by the particles in the CLC process remains problematic. Migration of metal oxides to the surface of the particles and modification of the texture of the support were observed, which adversely affect the performance and lifetime of the oxygen carrier particles.

P. Knutsson and C. Linderholm, 2015 ("Characterization of Ilmenite used as Oxygen Carrier in a 100 kW Chemical-Looping Combustor for Solid Fuels", Applied Energy 157, 2015, pages 368-373) have, for example, shown the development of high porosity in aged ilmenite ($FeTiO_3$ ore) particles, resulting in their disintegration in the form of fines. The observed increase in porosity is concomitant with the migration of ferrous and/or ferric ions by diffusion within the particles. According to the authors, segregation of the iron within the particles precedes its migration to the surface, creating the porosity that results in the disintegration of the particles in the form of fines. The estimated lifetime of ilmenite particles is only about 200 hours (cf. Abanades et al. 2015: "Emerging $CO_2$ Capture Systems", Int. J. Greenhouse Gas Control 40, 2015, pages 126-166).

Attrition of the oxygen carrier solid is thus mainly due to a morphological evolution linked to the consecutive redox cycles undergone by the particles, more than to the impacts on the walls and between particles, which are usually considered to be the main cause of attrition in fluidized bed processes.

Wei et al. 2015 ("Continuous Operation of a 10 kWth Chemical Looping Integrated Fluidized Bed Reactor for Gasifying Biomass Using an Iron-Based Oxygen Carrier". Energy Fuels 29, 2015, p.233-241) also mention the conversion of synthetic $Fe_2O_3/Al_2O_3$ (70/30) particles into small grains (i.e. pulverization of the particles into fines) after only 60 hours of combustion in a circulating fluidized bed.

Thus, some studies report, on the one hand, a loss of metal oxides during redox cycles, probably attributable to the migration of the metal oxides toward the outside of the particles, and then eliminated in the fines by attrition of the particles, as is the case, for example, for copper oxide, and, on the other hand, a modification of the particle support during the redox cycles, in particular of $CuO/Al_2O_3$ particles, the aluminic matrix of which cracks and may change in crystallographic structure, resulting in the formation of fine particles, as illustrated by Forero et al. 2011 ("High temperature behaviour of a $CuO/\gamma\text{-}Al_2O_3$ oxygen carrier for chemical-looping combustion", Int. J. Greenhouse Gas Control, 5, 2011, pages 659-667), or by Lambert et al. 2018 ("Performance and degradation mechanisms of CLC particles produced by industrial methods", Fuel 216, 2018, page 71).

Adanez-Rubio et al. 2013 ("Investigations of combined supports for Cu-based oxygen carriers for chemical-looping with oxygen uncoupling", Energy Fuels, 2013, 27, page 3918) report, for example, that the packed density of batches of CuO-based particles impregnated on different substrates ($TiO_2$, $SiO_2$, $MgAl_2O_4$) decreases appreciably, which may be attributed to a significant increase in the porosity of the particles and means that the lifetime of these particles is limited.

The migration of the metal with the number of cycles is also encountered with $Fe_2O_3/Al_2O_3$ particles, as reported by L. S. Fan et al. 2011 ("Ionic diffusion in the oxidation of iron—effect of support and its implications to chemical looping applications", Energy Environ. Sci. 4, 2011, page 876), or with nickel-based particles ($NiO/NiAl_2O_4$), as shown by Jerndal et al. 2010 ("Investigation of $NiO/NiAl_2O_4$ oxygen carriers for chemical-looping combustion produced by spray-drying", International Journal of Greenhouse Gas Control, 4, 2010, page 23). For $NiO/NiAl_2O_4$ particles, the presence of metallic nickel on the surface of the particles, due to the outward migration of nickel, is probably the cause of the formation of agglomerates observed by Linderholm et al. in 2009 ("Long-term integrity testing of spray-dried particles in a 10-kW chemical-looping combustor using natural gas as fuel", Fuel, 88(11), 2009, pages 2083-2096) representing a significant risk of accidental shutdown of the CLC process.

Patent application WO 2012/155059 discloses the use of oxygen carrier solids consisting of an active mass (20-70% by weight), i.e. metal oxides, a primary support material of ceramic or clay type (5-70% by weight), and a secondary support material (1-35% by weight), also of ceramic or clay type. The primary support material is considered to disperse the active metal mass and prevent its agglomeration, preserving the redox activity, whereas the secondary support material is considered to serve to reduce the volume expansion rate responsible for the embrittlement of the particles, by forming a stabilizing solid phase that prevents the migration of the iron to the surface.

Patent FR 2937030 teaches that stoichiometric spinels of general formula AxA'x'ByB'y'O4 may be used as oxygen carrier solids in chemical looping redox processes. However, the morphological evolution of these spinels during the redox cycles was not studied.

Patent FR 3061036 teaches that the use of an oxygen carrier solid whose macropore volume constitutes 20 at least 10% of a total pore volume of between 0.05 ml/g and 1.2 ml/g makes it possible to minimize the mobility of copper oxide within $CuO/Al_2O_3$ particles during redox cycles in a fluidized bed. After numerous cycles, the copper distribution is relatively homogeneous, but a high proportion of the copper forms cuprous nodules (CuO) within the particles.

The search for an oxygen carrier solid that is efficient, in terms of oxygen transfer capacity, reactivity with the various hydrocarbon feedstocks that are capable of being treated, and mechanical strength, thus remains a primary objective for the development of chemical looping redox processes, such as CLC.

OBJECTS AND SUMMARY OF THE INVENTION

The present invention is directed toward overcoming the problems of the prior art disclosed above, and is generally directed toward providing an oxygen carrier solid for a chemical looping redox process which has a long lifetime during the use thereof in the process, notably so as to reduce the investment and/or running costs of such processes.

Thus, in order to achieve at least one of the abovementioned objects, among others, the present invention proposes, according to a first aspect, an oxygen carrier in the form of particles for a chemical looping redox process such as chemical looping combustion, including:

- copper in a total content X of between 5% and 39% expressed as copper oxide by weight relative to the total weight of the oxygen carrier solid in its oxidized form;
- a ceramic matrix within which said copper is dispersed, said ceramic matrix including:
  - a first sub-stoichiometric spinel of formula $Mg_aAl_bO_4$, and/or
  - a second sub-stoichiometric spinel of formula $Cu_cMg_dAl_eO_4$, with the indices a, b, c, d, e corresponding to the formulae described below and in which $M_{MgO}$, $M_{CuO}$, $M_{Al2O3}$ are the respective molar masses of MgO, CuO and $Al_2O_3$, Y is the amount of MgO as a weight percentage of the oxygen carrier solid, with X ranging between 5% and 39%, Y ranging between 1% and 23%, and $Y<-0.6342X+26.22$.

According to one or more embodiments of the invention, the matrix comprises the first spinel or the second spinel.

According to one or more embodiments of the invention, the matrix consists substantially of the second spinel.

According to one or more embodiments of the invention, the particles have a substantially spherical shape, and a particle size such that more than 90% of the particles have a size of between 50 μm and 600 μm, preferably between 80 μm and 400 μm, and more preferentially between 100 μm and 300 μm.

According to one or more embodiments of the invention, the solid also includes:

- a total pore volume of the oxygen carrier solid Vtot, measured by mercury porosimetry, of between 0.05 and 1.2 ml/g;
- a pore volume of the macropores constituting at least 10% of Vtot;
- a size of the macropores within the oxygen carrier solid, measured by mercury porosimetry, of greater than 50 nm and less than or equal to 7 μm.

According to a second aspect, the invention relates to a process for preparing such an oxygen carrier solid, including the following steps:

(A) preparing an aqueous suspension including alumina particles and an aluminic binder, said aluminic binder preferably being boehmite and/or aluminum hydroxides, said alumina particles forming grains with a size of between 0.1 μm and 20 μm;

(B) spray-drying the suspension obtained in step (A) to form particles, said spray-drying involving spraying the suspension into a drying chamber with spraying means to form droplets, and simultaneously placing said droplets in contact with a hot carrier gas, preferably air or nitrogen, heated to a temperature of between 180° C. and 350° C.;

(C) calcining the particles resulting from the spray-drying in step (B), said calcining being performed in air and at a temperature of between 400° C. and 1400° C.;

(D) optional screening of the calcined particles obtained from step (C), preferably by separation using a cyclone;

(E) integrating Cu and Mg according to the sequence of steps (e1) and (e2), or according to step (e3), or according to steps (e3) and (e2) to produce the oxygen carrier solid in the form of particles:

(e1) (i) impregnating the calcined particles obtained from step (C) or optionally screened particles obtained from step (D) with an aqueous or organic solution containing at least one soluble Mg precursor compound, and then (ii) drying said impregnated particles obtained from (i) at a temperature of between 30° C. and 200° C., followed by (iii) calcination at a temperature of between 700° C. and 1400° C., preferably in air;

(e2) (j) impregnating the calcined particles obtained from step (e1) or the calcined particles obtained from step (C) or optionally the screened particles obtained from step (D), with an aqueous or organic solution containing at least one soluble Cu precursor compound and then (jj) drying said impregnated particles obtained from (j) at a temperature of between 30° C. and 200° C. followed by (jjj) calcination at a temperature of between 700° C. and 1400° C., preferably in air;

(e3) incorporating an Mg precursor and optionally a Cu precursor before step (B) according to one of the following sub-steps (k), (kk) or (kkk):

(k) before step (A), impregnating the alumina particles used for preparing the suspension in step (A) with an aqueous or organic solution containing at least one Mg precursor compound, and optionally a Cu precursor compound, optionally followed by drying the impregnated alumina particles at a temperature of between 30° C. and 200° C. and calcining the dried alumina particles at a temperature of between 700° C. and 1400° C., preferably in air;

(kk) after step (A) and before step (B), adding at least one soluble Mg precursor, and optionally a soluble Cu precursor, to the suspension obtained from step (A);

(kkk) after step (A) and before step (B), adding to the suspension obtained from step (A) at least one Mg oxide, and optionally a Cu oxide, said oxide(s) being in the form of grains with a size of between 0.1 μm and 20 μm;

it being understood that step (e2) is necessarily performed in combination with step (e3) if no Cu precursor compound or soluble Cu precursor compound or Cu oxide is added during sub-steps (k), (kk) and (kkk) in step (e3).

According to one or more embodiments of the invention, the calcination in step (C) and/or in step (e1)(iii) and/or in step (e2)(jjj) and/or in step (e3)(k) is performed for a period of 1 to 24 hours, and preferably the calcination in step (C) is performed for a period of 3 to 6 hours or for a period of 5 to 15 hours, the calcination in step (e1)(iii) and/or in step (e3)(k) is performed for a period of 3 to 6 hours, and the calcination in step (e2)(jjj) is performed for a period of 5 to 15 hours.

According to one or more embodiments of the invention, the calcination in step (C) and/or step (e1)(iii) and/or step (e2)(jjj) and/or step (e3)(k) is performed according to a temperature increase ramp of between 1° C./min and 50° C./min, and preferably between 5° C./min and 20° C./min, to reach the given calcination temperature.

According to one or more embodiments of the invention, the calcination in step (C) is performed in air at a temperature of between 800° C. and 950° C., and more preferentially between 900° C. and 950° C., the calcination in step (e1)(iii) and/or in step (e3)(k) is performed in air at a temperature of between 750° C. and 950° C., and the calcination in step (e2)(jjj) is performed in air at a temperature of between 900° C. and 950° C.

According to one or more embodiments of the invention, the impregnation in step (e1)(i) and/or step (e3)(k) is performed dry with an aqueous solution including magnesium nitrate.

According to one or more embodiments of the invention, the impregnation in step (e2)(j) is performed with an aqueous solution including copper nitrate.

According to one or more embodiments of the invention, in step (e3)(kk) magnesium nitrate is added to the suspension obtained from step (A) as a soluble Mg precursor, and optionally copper nitrate is added as a soluble Cu precursor.

According to one or more embodiments of the invention, the impregnation in at least one of the steps (e1)(i) or (e2)(j) is performed in several successive steps, and an intermediate calcination between two successive impregnation steps is preferably performed, at a temperature of between 400° C. and 600° C.

According to one or more embodiments of the invention, the amounts of magnesium and copper precursors are calculated so that Y is between 1% and 23% and X is between 5% and 39%, with $Y<-0.6342X+26.223$, so as to form the first sub-stoichiometric spinel and/or the second sub-stoichiometric spinel.

According to one or more embodiments of the invention, the integration of Cu and Mg is performed according to step (e3), and preferably according to sub-step (kk) or (kkk), and in which the calcination in step (C) is performed in air at a temperature of between 800° C. and 950° C., and more preferentially between 900° C. and 950° C., and for a time of from 1 to 24 hours, preferably from 5 hours to 15 hours.

According to a third aspect, the invention relates to a process for the combustion of a hydrocarbon feedstock by chemical looping redox using such an oxygen carrier solid or one prepared according to the preparation process according to the invention.

According to one or more embodiments of the invention, the oxygen carrier solid circulates between at least one reduction zone and one oxidation zone both operating in a fluidized bed, the temperature in the reduction zone and in the oxidation zone being between 600° C. and 1200° C., preferably between 600° C. and 1100° C., and more preferentially between 800° C. and 1100° C.

Other subjects and advantages of the invention will become apparent on reading the description which follows of particular exemplary embodiments of the invention, which are given as nonlimiting examples, the description being made with reference to the appended figures described below.

LIST OF FIGURES

FIG. 1 is a diagram showing the amounts of CuO and MgO in the oxygen carrier according to the invention.

FIGS. 2A, 2B, 2C, 2D and 2E relate to an oxygen carrier solid according to Example 2 (example not in accordance with the invention).

FIGS. 3A, 3B, 3C and 3D relate to an oxygen carrier solid according to Example 3 (example in accordance with the invention).

Figure 3A:
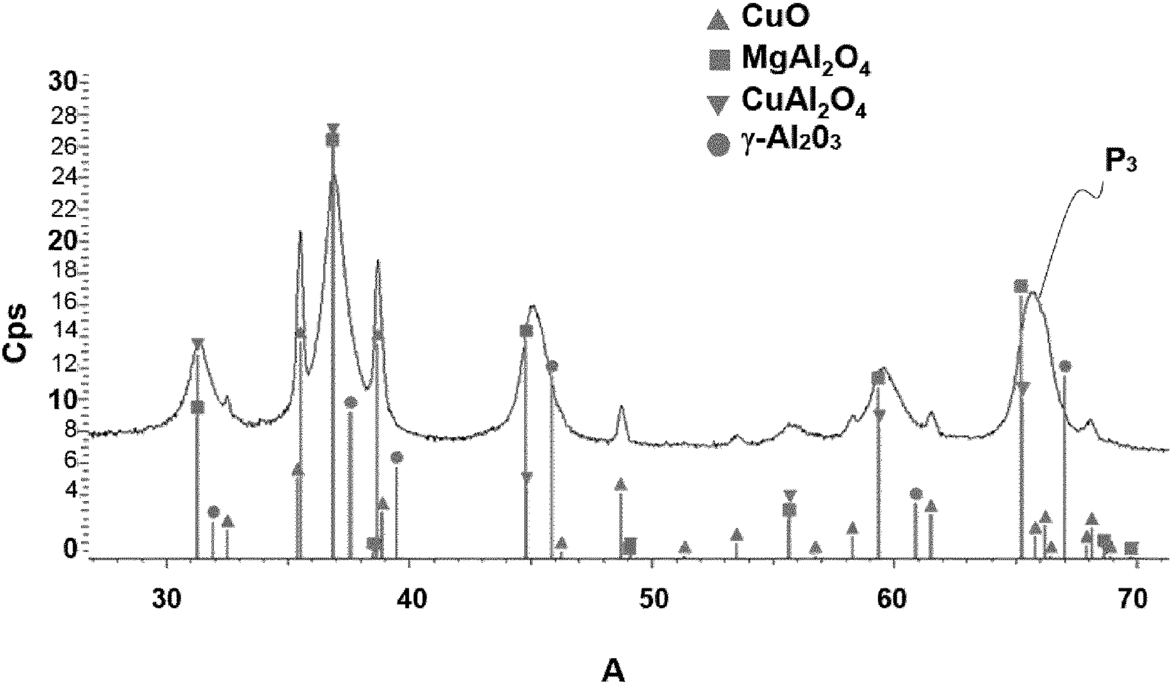

FIG. 3A is an X-ray diffraction (XRD) pattern of the oxygen carrier solid calcined at 800° C. prior to an aging test simulating its use in a CLC process.

Figure 3B:
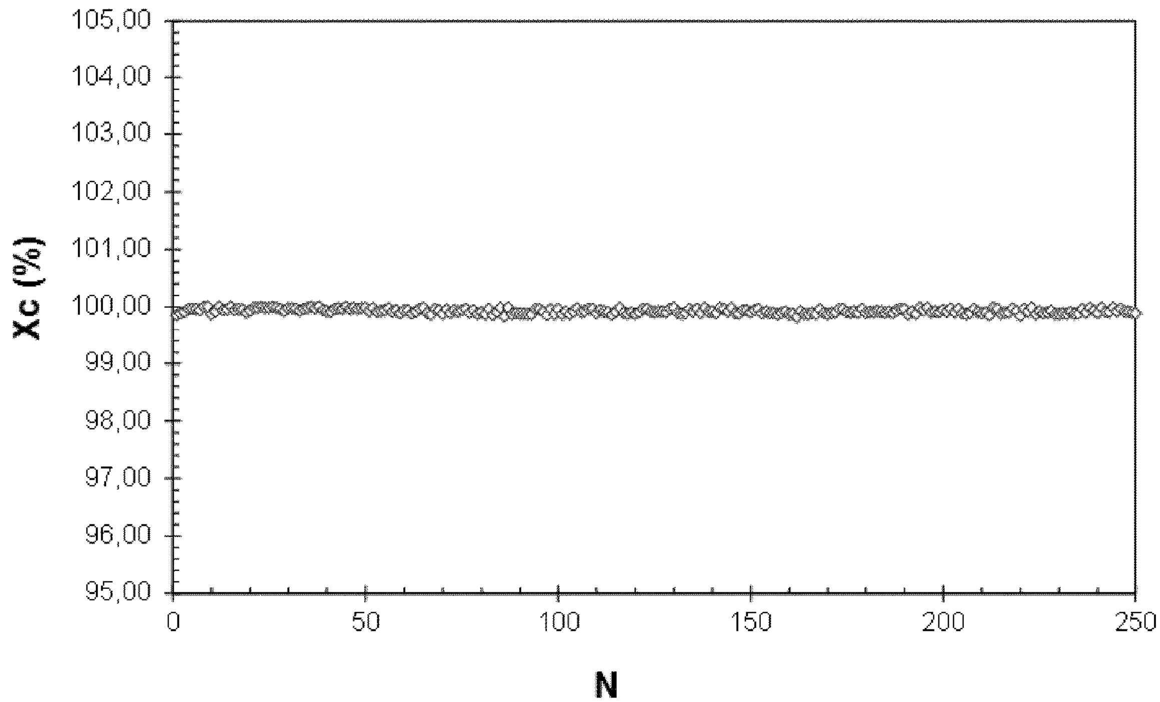

FIG. 3B is a diagram showing the conversion of methane as a function of the redox cycles in a CLC process using the oxygen carrier solid.

Figure 3C:
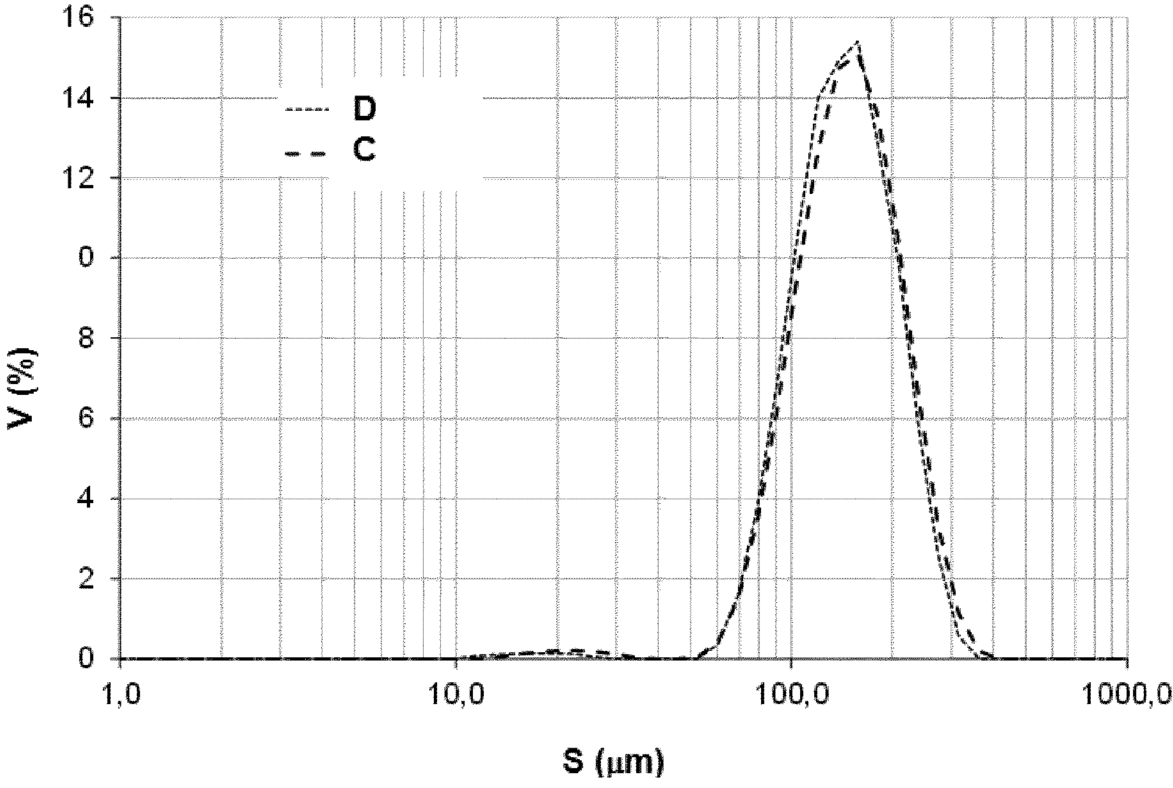

FIG. 3C is a diagram showing the particle size distribution of the oxygen carrier solid before (C) and after (D) an aging test simulating its use in a CLC process.

Figure 3D:
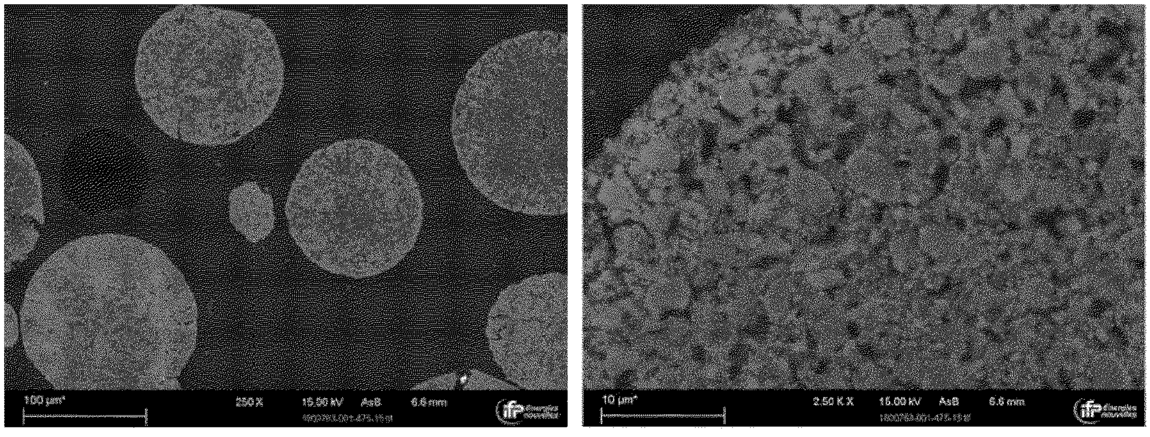

FIG. 3D is a set of SEM images of a polished section of a sample of the oxygen carrier solid after aging tests simulating its use in a CLC process.

FIGS. 4A, 4B, 4C and 4D relate to an oxygen carrier solid according to Example 4 (example in accordance with the invention).

Figure 4A:
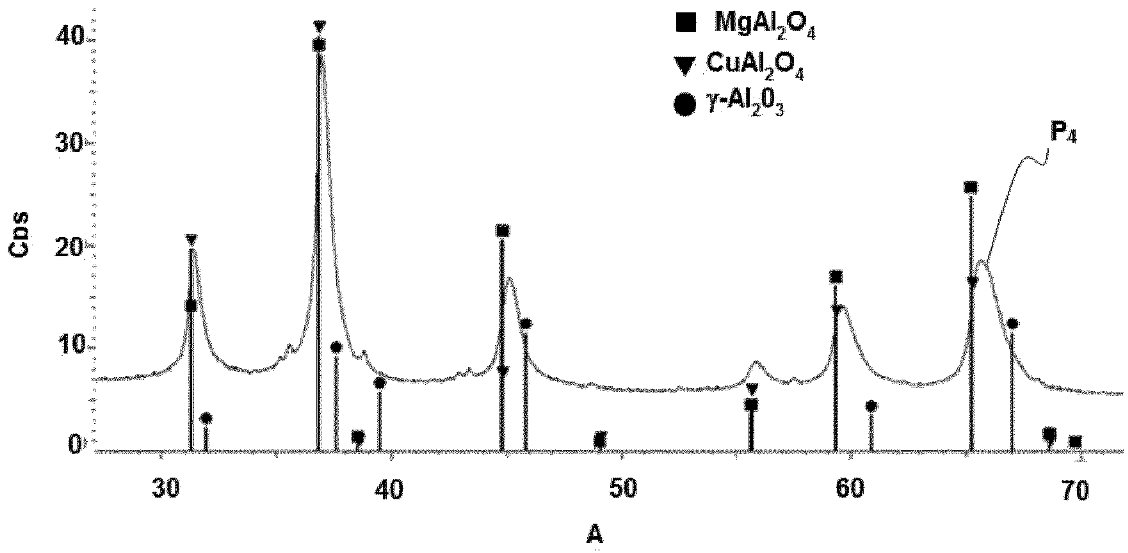

FIG. 4A is an X-ray diffraction (XRD) pattern of the oxygen carrier solid calcined at 900° C. prior to an aging test simulating its use in a CLC process.

Figure 4B:
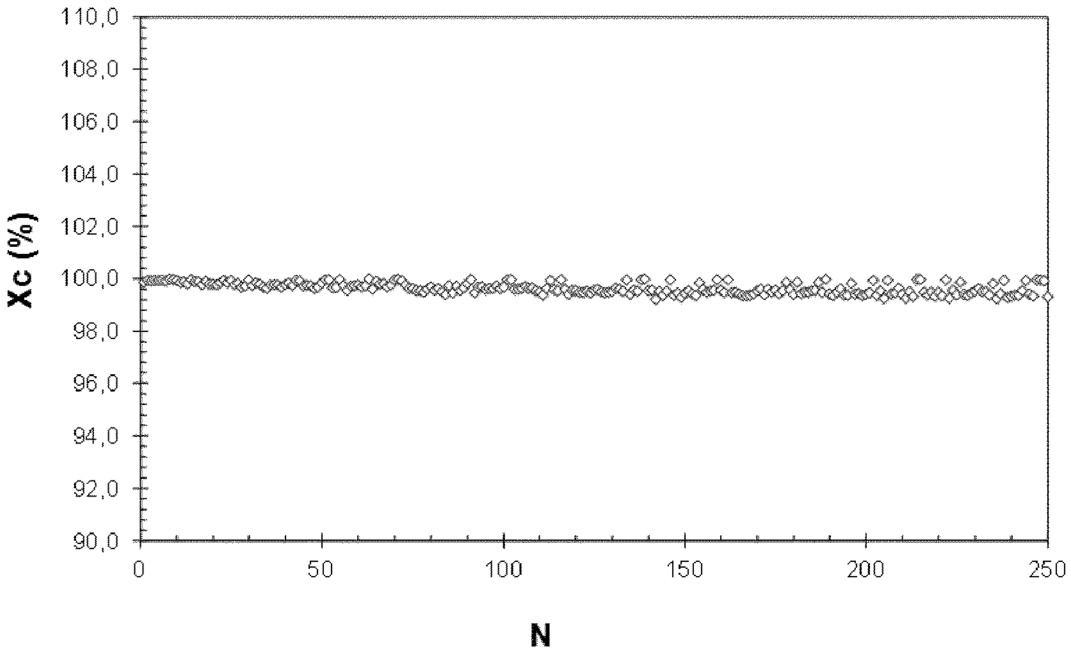

FIG. 4B is a diagram showing the conversion of methane as a function of the redox cycles in a CLC process using the oxygen carrier solid.

Figure 4C:
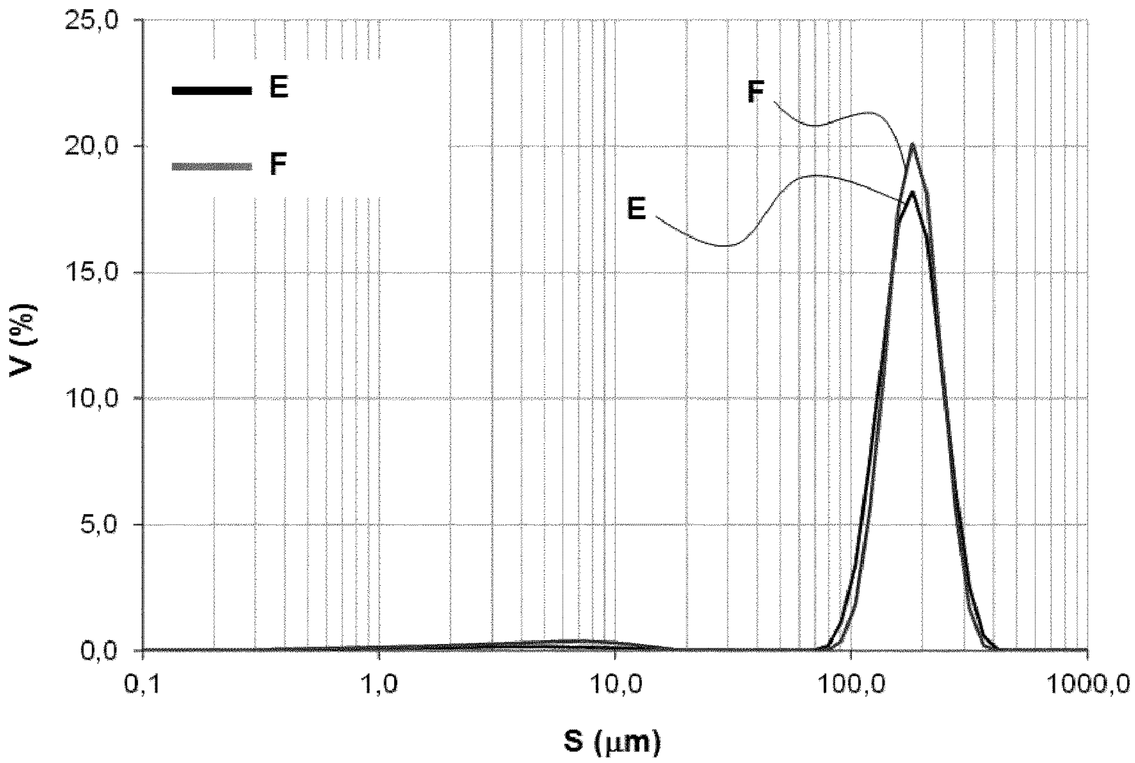

FIG. 4C is a diagram showing the particle size distribution of the oxygen carrier solid before (E) and after (F) an aging test simulating its use in a CLC process.

Figure 4D:
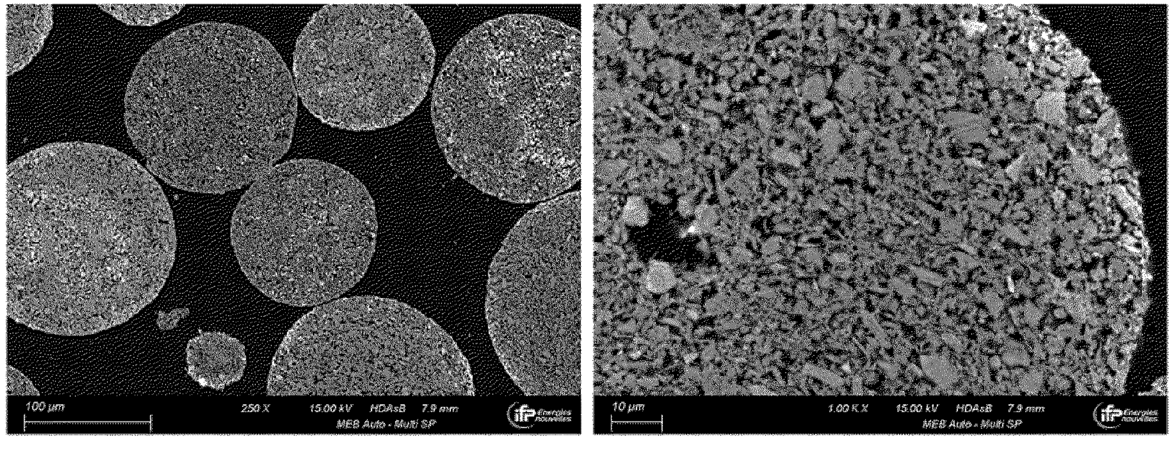

FIG. 4D is a set of SEM images of a polished section of a sample of the oxygen carrier solid after aging tests simulating its use in a CLC process.

Figure 5A:
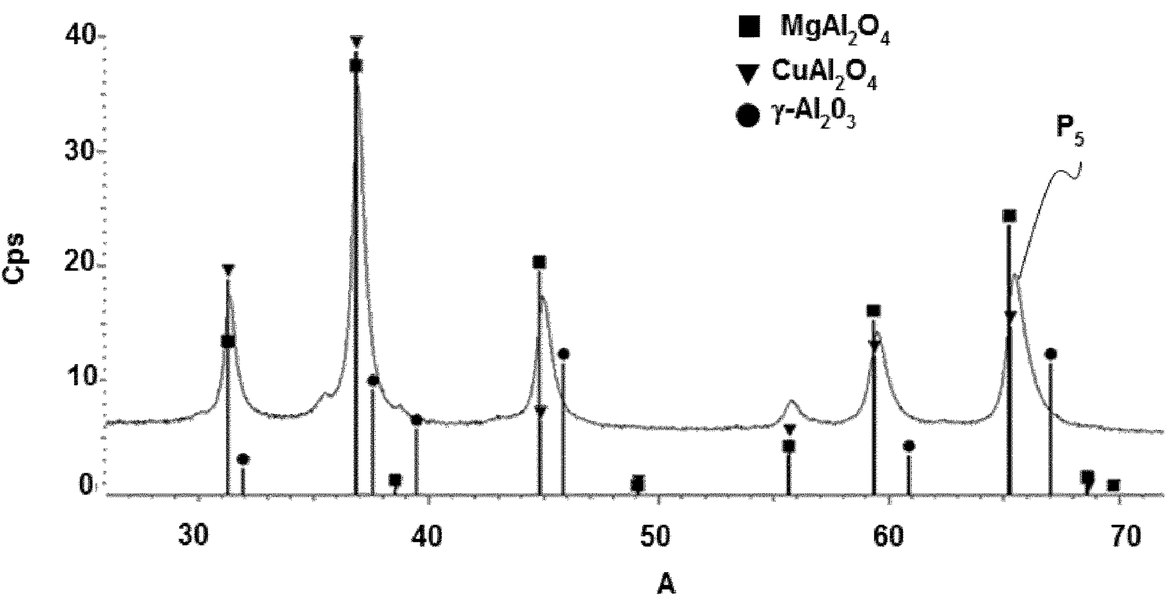
Figure 5B:
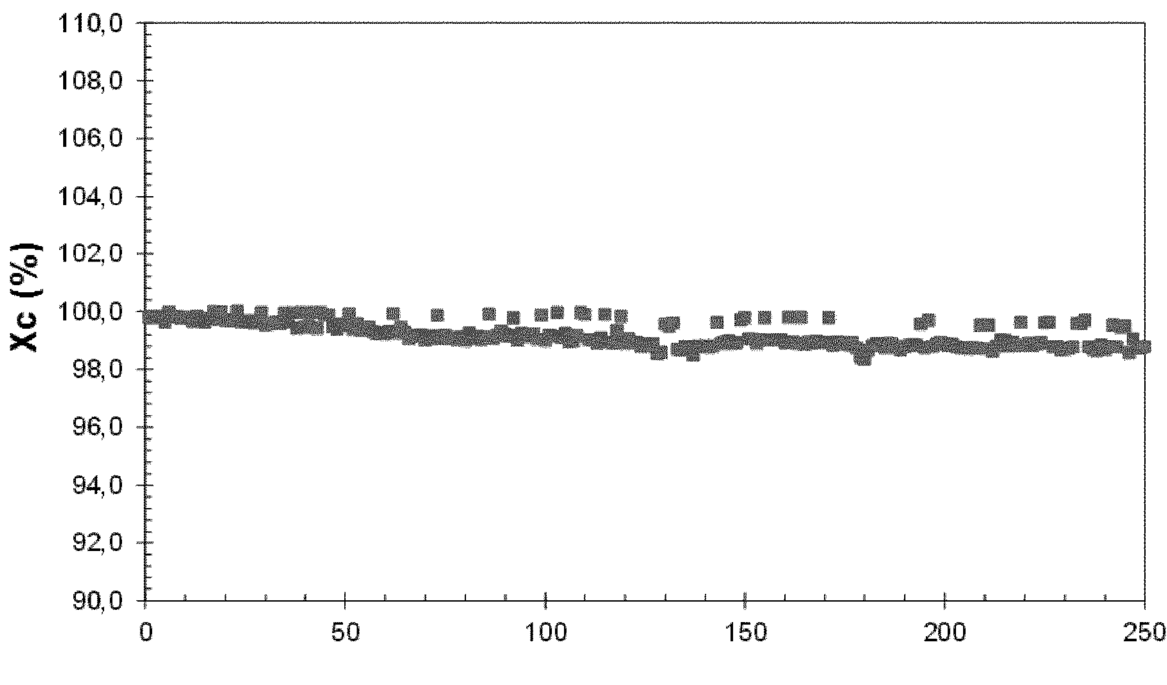
Figure 5C:
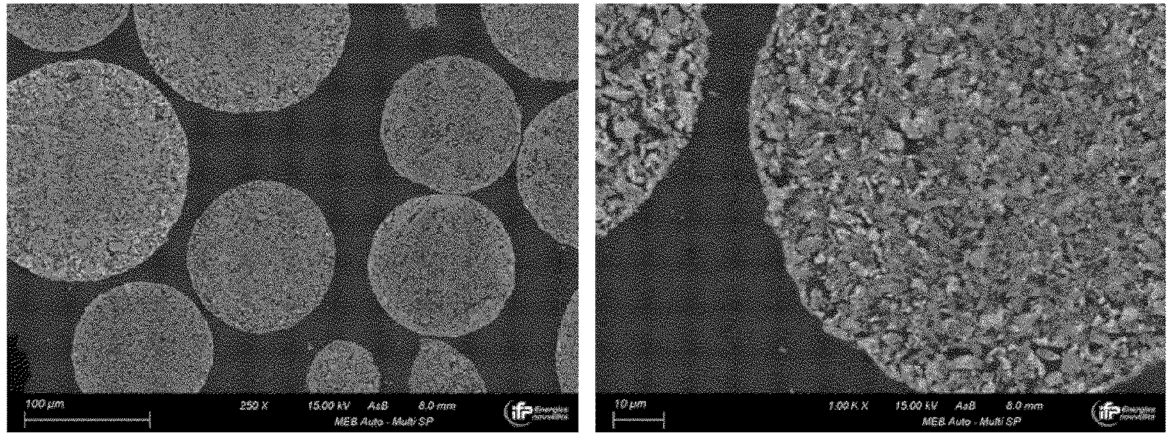

FIGS. 5A, 5B and 5C relate to an oxygen carrier solid according to Example 5 (example in accordance with the invention).

FIG. 5A is an X-ray diffraction (XRD) pattern of the oxygen carrier solid calcined at 900° C. prior to an aging test simulating its use in a CLC process.

FIG. 5B is a diagram showing the conversion of methane as a function of the redox cycles in a CLC process using the oxygen carrier solid.

FIG. 5C is a set of SEM images of a polished section of a sample of the oxygen carrier solid after aging tests simulating its use in a CLC process.

Figure 6A:
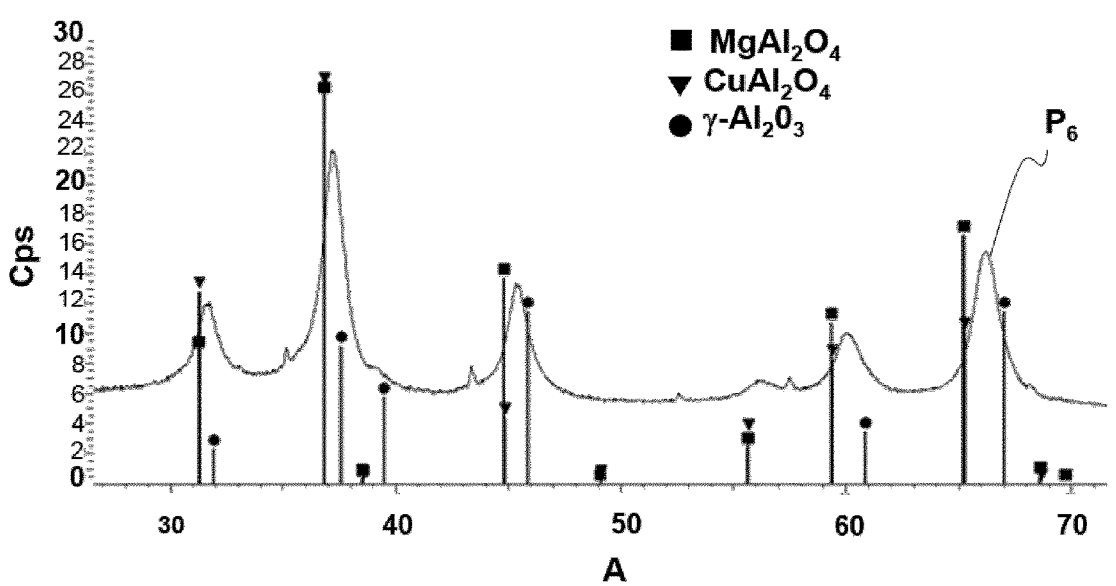
Figure 6B:
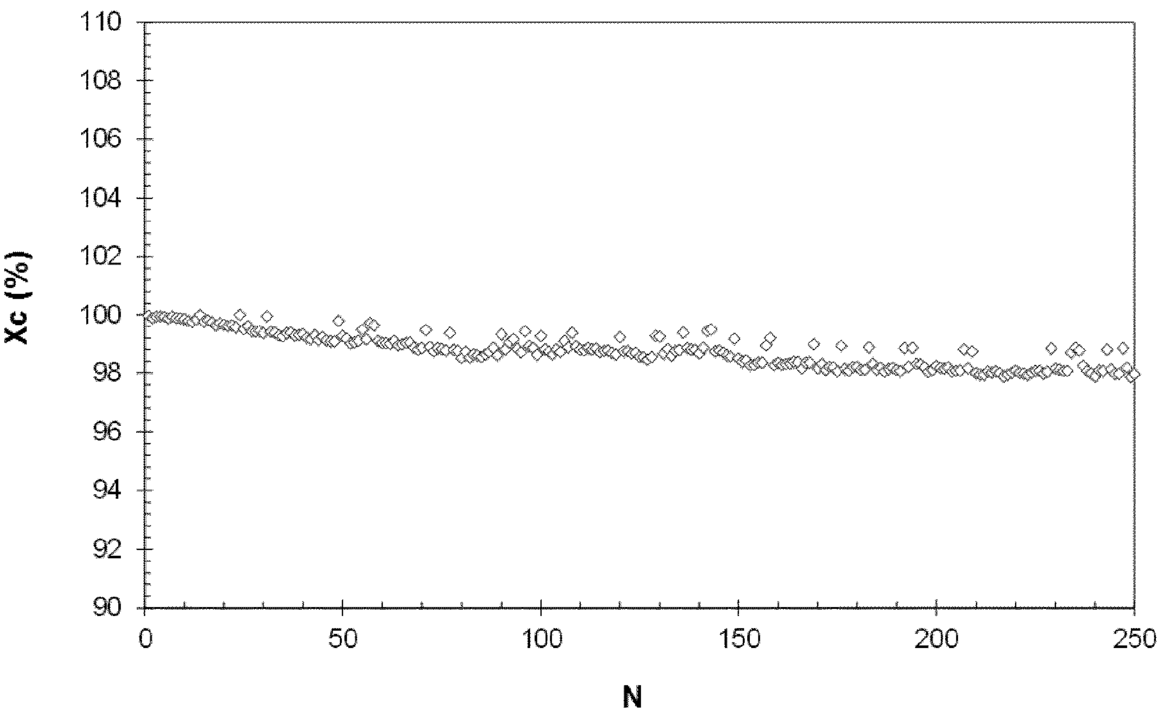
Figure 6C:
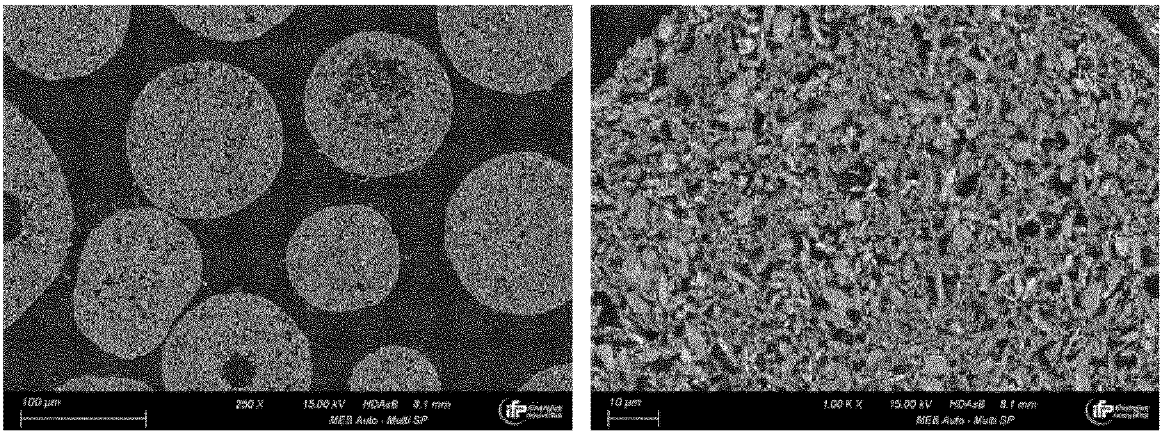

FIGS. 6A, 6B and 6C relate to an oxygen carrier solid according to Example 6 (example in accordance with the invention).

FIG. 6A is an X-ray diffraction (XRD) pattern of the oxygen carrier solid calcined at 900° C. prior to an aging test simulating its use in a CLC process.

FIG. 6B is a diagram showing the conversion of methane as a function of the redox cycles in a CLC process using the oxygen carrier solid.

FIG. 6C is a set of SEM images of a polished section of a sample of the oxygen carrier solid after aging tests simulating its use in a CLC process.

DESCRIPTION OF THE EMBODIMENTS

The object of the invention is to propose an oxygen carrier solid for a chemical looping redox process, such as a CLC process, but also for other chemical looping redox processes such as a chemical looping reforming (CLR) process or a chemical looping oxygen uncoupling (CLOU) process.

The present invention also relates to the preparation and use of the oxygen carrier solid in such processes, in particular in a CLC process.

CLC processes generally involve two different reactors: a reduction reactor and an oxidation reactor. In the reduction reactor, the oxygen carrier solid is reduced by means of a fuel, or more generally a reducing gas, liquid or solid. The effluents from the reduction reactor mainly contain $CO_2$ and water, allowing easy capture of the $CO_2$. In the oxidation reactor, the restoration of the oxygen carrier solid to its oxidized state by contact with air or any other oxidizing gas allows the correlative generation of a hot energy-carrying effluent and an oxygen-poor or oxygen-depleted nitrogen stream (when air is used).

In the present description, reference is especially made to the use of the oxygen carrier solid in a circulating fluidized-bed CLC process, but the oxygen carrier solid according to the invention may also be used in any other type of chemical looping (CLC, CLR, CLOU) redox process in a fixed, moving or ebullated bed, or alternatively in a rotating reactor.

The Oxygen Carrier Solid

The oxygen carrier solid includes:

- copper in a total content X of between 5% and 39% expressed as copper oxide by weight relative to the total weight of the oxygen carrier solid in its oxidized form;
- a ceramic matrix within which the copper is dispersed, said ceramic matrix including, and preferably consisting essentially of:
  - a first sub-stoichiometric spinel of formula $Mg_aAl_bO_4$, and/or
  - a second sub-stoichiometric spinel of formula $Cu_cMg_dAl_eO_4$, with:

$$a = \frac{4}{\left(1 + \left(3 \times \left(\frac{(100 - X)}{Y} - 1\right) \times \frac{M_{MgO}}{M_{Al2O3}}\right)\right)}$$

$$b = \frac{8 \times (100 - X - Y)}{\left(Y \times \frac{M_{Al2O3}}{M_{MgO}} + 3 \times (100 - X - Y)\right)}$$

$$c = \frac{4X}{M_{CuO} \times \left(\frac{X}{M_{CuO}} + \frac{Y}{M_{MgO}} + 3 \times \frac{100 - X - Y}{M_{Al2O3}}\right)}$$

$$d = \frac{4Y}{M_{MgO} * \left(\frac{X}{M_{CuO}} + \frac{Y}{M_{MgO}} + 3 \times \frac{100 - X - Y}{M_{Al2O3}}\right)}$$

$$e = \frac{8 \times (100 - X - Y)}{M_{Al2O3} \times \left(\frac{X}{M_{CuO}} + \frac{Y}{M_{MgO}} + 3 \times \frac{100 - X - Y}{M_{Al2O3}}\right)}$$

$M_{MgO}$, $M_{CuO}$ and $M_{Al2O3}$ being the molar masses of MgO, CuO and $Al_2O_3$, respectively, Y being the amount of MgO as a weight percentage of the oxygen carrier solid, with X being between 5% and 39%, Y being between 1% and 23%, and Y<26.223-0.6342X.

The composition of the oxygen carrier solid according to the invention is understood to be an "initial" composition, as known to those skilled in the art, i.e. after obtaining the oxygen carrier solid according to the described manufacturing process and prior to using the oxygen carrier in a chemical looping redox process, such as CLC.

The term "a ceramic matrix essentially consisting of" means that the matrix comprises more than 95% of sub-stoichiometric spinel(s) described above.

It is pointed out that, throughout the present description, the expressions "comprising/consisting of between . . . and . . . " are to be understood as including the mentioned limit values, unless otherwise specified.

In the present application, the term "to comprise" is synonymous with (means the same thing as) "to include" and "to contain", and is inclusive or open and does not exclude other elements which are not stated. It is understood that the term "comprise" includes the exclusive and closed term "consist".

In the present description, for the sake of simplicity, the sub-stoichiometric spinel of formula $Mg_aAl_bO_4$ is referred to as the "first" spinel and the sub-stoichiometric spinel of formula $Cu_cMg_dAl_eO_4$ is referred to as the "second" spinel.

The total copper content expressed as a weight percentage of copper oxide (5%-39%) in the oxygen carrier solid comprises the copper present in the sub-stoichiometric second spinel if it is present in the oxygen carrier matrix.

The proportion of copper in the oxygen carrier solid is given for the oxygen carrier in its initial fully oxidized form, which is the conventional form after its preparation and during its storage. This is likewise the case for the proportion of magnesium.

In the oxygen carrier according to the invention, copper constitutes the active redox mass, in its copper oxide/metal copper form or integrated into the second spinel of formula $Cu_cMg_dAl_eO_4$. In other words, the ceramic matrix $Cu_cMg_dAl_eO_4$ of the oxygen carrier may be considered as active in the redox process, which gives rise to the oxygen carrier function of the oxygen carrier solid according to the invention.

The total copper content X, expressed as a weight percentage of copper oxide relative to the total weight of the oxygen carrier solid in its oxidized form, is between 5% and 39%. The copper is in the form of CuO or $Cu_cMg_dAl_eO_4$ or a mixture of both. Preferably, said total copper content is between 5% and 30%, more preferentially said total copper content is between 10% and 30%, and even more preferentially said total copper content is between 10% and 20%.

The nature of the spinel, i.e. the first sub-stoichiometric spinel or the second sub-stoichiometric spinel, depends initially on the mode of preparation of the oxygen carrier, and in particular on the calcination temperature applied: it is observed that at a calcination temperature of the oxygen carrier of 900° C., the second sub-stoichiometric spinel is formed, whereas at a calcination temperature of 800° C., the oxygen carrier is in the form of a mixed CuO/first sub-stoichiometric spinel oxide (visible presence of CuO and the first spinel by XRD analysis). There is thus a calcination temperature between 800° C. and 900° C. at and above which the copper oxide CuO reacts with the first sub-stoichiometric spinel to form the second sub-stoichiometric spinel.

Independently of its initial structure, the oxygen carrier solid may be used in the chemical looping redox process, such as CLC, under temperature conditions which lead to the formation of the second sub-stoichiometric spinel.

A reminder is given hereinbelow of what is commonly understood by spinels, along with the definition of the sub-stoichiometric spinels included in the composition of the oxygen carrier solid according to the invention.

The group of spinels consists of oxides whose structure reproduces that of the mineral spinel $MgAl_2O_4$.

Among the oxides having a spinel structure are many natural compounds, such as magnetite ($Fe_3O_4$), chromite ($FeCr_2O_4$) and gahnite ($ZnAl_2O_4$). The general formula of spinels is $AB_2O_4$, where A is a divalent cation and B is a trivalent cation. In the spinel structure, the oxide ions ($O^{2-}$) form a face-centered cubic lattice. This lattice has two kinds of interstitial sites: tetrahedral sites and octahedral sites. In particular, the primitive cubic unit cell of the spinel lattice has 64 tetrahedral sites, of which only 8 are occupied by metal ions, and 32 octahedral sites, of which 16 are occupied. Two particular types of cation arrangements have been observed. In normal spinels, trivalent ions occupy the octahedral sites and divalent ions occupy the tetrahedral sites. Each oxide ion is thus connected to one divalent ion and three trivalent ions. In inverse spinels, the tetrahedral sites are occupied by half of the trivalent ions and the octahedral sites by the other half of the trivalent ions and by the divalent ions. There are also spinels where both types of cations occupy both the tetrahedral and octahedral sites: these are mixed spinels, of which the two previously mentioned cases are the limiting cases (SM IT and WIJN, Les Ferrites, Techn. Philipps, 1961).

Gamma alumina is commonly described as a lacunar spinel structure, in which the oxide ions approximately have compact cubic stacking. Each alumina unit cell contains 21⅓ aluminum ions ($Al^{3+}$) distributed among the octahedral and tetrahedral sites, whereas the 2⅔ vacancies are randomly distributed among the tetrahedral sites. Under oxidizing conditions and at elevated temperature, $M^{2+}$ cations may insert into these vacancies, at the same time as oxide ions complete the compact cubic stacking characteristic of spinel in order to maintain the electrical neutrality of the crystal lattice. When a stoichiometric amount of metal M is present (i.e. one $M^{2+}$ and one $O^{2-}$ per $Al_2O_3$ unit cell), the spinel $MAl_2O_4$ is thus obtained (M=Mg, Ca, Zn, Fe, Cu, etc.). When the amount of inserted cations is less than the stoichiometry, a sub-stoichiometric spinel is obtained, i.e. not all the vacancies are occupied by an $M^{2+}$ cation.

Thus, the formation of a spinel from MgO and $Al_2O_3$ in a mole ratio n proceeds according to the equation below (A. P. Tomsia and A. M. Glaeser, Ceramic Microstructures. Control at the Atomic Level, Springer US, Boston, MA, 1998):

$$MgO + n\ Al_2O_3 \rightarrow (1+3n)/4\ Mg_{4/(1+3n)}Al_{8n/(1+3n)}O_4$$

If n is greater than 1, the spinel obtained is sub-stoichiometric in Mg.

Sub-Stoichiometric First Spinel of Formula $Mg_aAl_bO_4$:

In the formula of the first spinel, the indices a and b, linked by the copper and magnesium contents, are expressed according to the following relationships:

$$a = \frac{4}{\left(1 + \left(3 \times \left(\frac{(100-X)}{Y} - 1\right) \times \frac{M_{MgO}}{M_{Al2O3}}\right)\right)}$$

and $$b = \frac{8 \times (100-X-Y)}{\left(Y \times \frac{M_{Al2O3}}{M_{MgO}} + 3 \times (100-X-Y)\right)}$$

$M_{MgO}$ and $M_{Al2O3}$ are the molar masses of MgO and $Al_2O_3$, respectively.

X is the amount of CuO as a weight percentage of the oxygen carrier solid, and Y is the amount of MgO as a weight percentage of the oxygen carrier solid, X is between 5% and 39%, and Y is between 1% and 23%.

In order to ensure sub-stoichiometry, the following relationship must be respected: $Y < -0.6342X + 26.223$.

By way of example, for a total copper content, expressed as CuO, of 13% in the oxygen carrier, a is approximately equal to 0.72 and b is approximately equal to 2.19, which corresponds to an MgO content of 18%.

Second Sub-Stoichiometric Spinel of Formula $Cu_cMg_dAl_eO_4$:

In the second spinel formula, the indices c, d and e, linked by the copper and magnesium contents, are expressed according to the following relationships:

$$c = \frac{4X}{M_{CuO} \times \left(\frac{X}{M_{CuO}} + \frac{Y}{M_{MgO}} + 3 \times \frac{100-X-Y}{M_{Al2O3}}\right)}$$

$$d = \frac{4Y}{M_{MgO} * \left(\frac{X}{M_{CuO}} + \frac{Y}{M_{MgO}} + 3 \times \frac{100-X-Y}{M_{Al2O3}}\right)}$$

$$e = \frac{8 \times (100-X-Y)}{M_{Al2O3} \times \left(\frac{X}{M_{CuO}} + \frac{Y}{M_{MgO}} + 3 \times \frac{100-X-Y}{M_{Al2O3}}\right)}$$

$M_{MgO}$, $M_{CuO}$ and $M_{Al2O3}$ are the molar masses of MgO, CuO and $Al_2O_3$, respectively, It is recalled that the molar masses of MgO, CuO and $Al_2O_3$ $M_{CuO}$ are as follows:

$M_{MgO}$=40.305 g/mol, $M_{CuO}$=79.546 g/mol, and $M_{Al2O3}$=101.96 g/mol.

X is the amount of CuO as a weight percentage of the oxygen carrier solid, and Y is the amount of MgO as a weight percentage of the oxygen carrier solid, X is between 5% and 39% and Y is between 1% and 23%.

The following relationship is respected to ensure sub-stoichiometry of the second spinel:

$$Y<-0.6342X+26.223.$$

By way of example, for a total copper content, expressed as CuO, of 11.5% in the oxygen carrier, c is equal to about 0.20, d is equal to about 0.13, and e is equal to about 2.44, which corresponds to an MgO content of 3.5%.

From a theoretical viewpoint, the second spinel, obtained after calcination above 800° C., typically at 900° C., is sub-stoichiometric as long as e>2 (strictly). In practice, in order to ensure the formation of a sub-stoichiometric spinel, the CuO and MgO contents chosen for the oxygen carrier solid are such that e>2.05 to ensure that there is an excess of alumina relative to the copper and magnesium.

Figure 1:
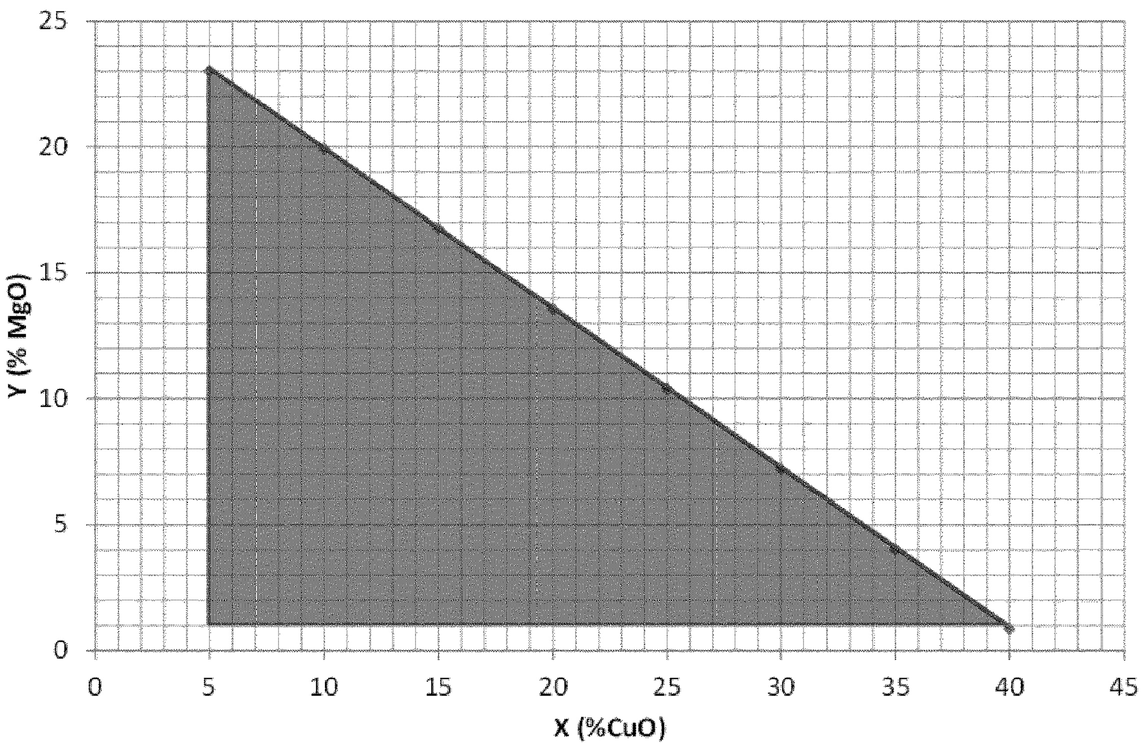

For the purposes of the invention, restricted values of X and Y within the triangle shown in FIG. 1 are taken, for which e>2.05, so as to ensure the formation of a sub-stoichiometric spinel. This is also reflected by the relationship Y<−0.6342X+26.223, with X between 5% and 39% and Y between 1% and 23%.

When the oxygen carrier solid according to the invention is calcined at a temperature above 800° C., the copper oxide inserts itself into the structure of the first sub-stoichiometric spinel $Mg_aAl_bO_4$ to form another sub-stoichiometric spinel, the second spinel, having the formula $Cu_cMg_dAl_eO_4$ where c, d and e depend on both the magnesium and copper contents. A person skilled in the art will easily choose the appropriate Cu and Mg contents so as not to fill all the octahedral and tetrahedral sites of the spinel structure of alumina.

Various methods are known to those skilled in the art for preparing spinels, some of which are recalled in patent FR 2934263.

The oxygen carrier according to the invention, including a ceramic matrix with a sub-stoichiometric spinel structure as defined above, makes it possible to significantly improve the distribution of copper during the redox cycles of the chemical looping redox process, for example the CLC process, notably in comparison with oxygen carriers as described in patent FR 3061036.

Without being bound to any particular theory, the inventors attribute the substantial improvement obtained in the presence of a sub-stoichiometric Mg spinel to the insertion of copper into the spinel structure of the alumina at each oxidation cycle, thus avoiding the transformation of gamma alumina into alpha alumina and forcing the copper to become redispersed within the support at each cycle.

According to one embodiment, the oxygen carrier solid has a macroporous texture, this specific porosity being characterized as follows:

- a total pore volume of the oxygen carrier solid Vtot, measured by mercury porosimetry, of between 0.05 and 1.2 ml/g;
- a pore volume of the macropores constituting at least 10% of Vtot;
- a size distribution of macropores within the oxygen carrier solid, measured by mercury porosimetry, of greater than 50 nm and less than or equal to 7 μm.

This macroporous texture is the initial texture of the oxygen carrier solid, i.e. before any use in a chemical looping redox process such as CLC.

Such an initial macroporous texture of the oxygen carrier solid further prevents the migration of the active mass, i.e. copper, within the particles.

It is recalled that according to the IUPAC nomenclature, micropores are defined as pores whose size (aperture) is less than 2 nm, mesopores are defined as pores whose size is between 2 nm and 50 nm, and macropores are defined as pores greater than 50 nm in size.

The term "total pore volume" means the volume measured with a mercury intrusion porosimeter according to the standard ASTM D4284-83 at a maximum pressure of 4000 bar (400 MPa), using a surface tension of 484 dynes/cm and a contact angle of 140°. The wetting angle used was equal to 140° following the recommendations of the publication "Techniques de l'ingénieur, traité analyse et caractérisation" [Techniques of the Engineer, Analysis and Characterization Treatise], pages 1050-1055, written by Jean Charpin and Bernard Rasneur.

The total pore volume of the solid is measured by mercury porosimetry, more specifically the measurement relates to the volume of mercury injected when the pressure exerted increases from 0.22 MPa to 413 MPa.

The total pore volume Vtot of the oxygen carrier solid is more preferentially between 0.1 ml/g and 0.85 ml/g.

More preferentially, the pore volume of the macropores constitutes at least 40% of Vtot of the oxygen carrier solid, and even more preferentially at least 50% of Vtot. The remainder of the pore volume may be either microporosity or mesoporosity in any proportion.

The size distribution of the macropores within the particles, measured by mercury porosimetry, is more preferentially greater than 50 nm and less than or equal to 3 μm, and even more preferably greater than 50 nm and less than or equal to 500 nm.

The macropore volume is measured by mercury intrusion porosimetry according to the standard ASTM D4284-83 at a maximum pressure of 4000 bar (400 MPa), using a surface tension of 484 dynes/cm and a contact angle of 140°. The value at and above which the mercury fills all the intergranular voids is set at 0.2 MPa and it is considered that, above this value, the mercury penetrates into the pores of the sample.

The mesopore volume is measured in the same way as the macropore volume.

The macropore volume is defined as being the cumulative volume of mercury introduced at a pressure of between 0.2 MPa and 30 MPa, corresponding to the volume contained in the pores with an apparent diameter of greater than 50 nm.

The mesopore volume is defined as being the cumulative volume of mercury introduced at a pressure of between 30 MPa and 400 MPa, corresponding to the volume contained in the pores with an apparent diameter of between 2 and 50 nm.

The micropore volume is measured by nitrogen porosimetry. The quantitative analysis of the microporosity is performed by means of the "t" method (Lippens-De Boer method, 1965), which corresponds to a transform of the starting adsorption isotherm, as described in the publication "Adsorption by Powders and Porous Solids. Principles, Methodology and Applications", written by F. Rouquérol, J. Rouquérol and K. Sing, Academic Press, 1999.

According to the invention, the oxygen carrier solid may be prepared from the treatment of solid particles obtained by a technique of spray-drying of an aqueous suspension of aluminum oxide(s), hydroxides and/or oxyhydroxides of specific size. The micronized powder obtained after drying may then be calcined, for example at 700° C., to convert the aluminum hydroxides and/or oxyhydroxides into gamma alumina. The sub-stoichiometric spinel of formula $Mg_aAl_bO_4$ may then be formed by dry impregnation of soluble Mg precursors, typically with magnesium nitrate. After drying and calcining the particles, the oxygen carrier solid according to the invention may then be dry-impregnated with a soluble copper precursor, typically copper nitrate. The impregnation with soluble Cu and Mg precursors may also be performed simultaneously. Alternatively, the copper and magnesium precursors may be added to the aqueous suspension of aluminum oxide(s), hydroxides and/or oxyhydroxides prior to spray drying. The preparation of the oxygen carrier solid according to the invention is described in detail later in the description.

The oxygen carrier solid according to the invention is in the form of particles, which may be fluidized in the chemical looping redox process, notably performed in a circulating fluidized bed. They may be fluidizable particles (fluidizable powder, generally referred to as "fluidizable carrier") belonging to groups A, B or C of the Geldart classification (D. Geldart, "Types of gas fluidization", Powder Technol., 7(5), 1973, pages 285-292), and preferably the particles belong to group A or group B of the Geldart classification, and preferably to group B of the Geldart classification.

Preferably, the particles of the oxygen carrier solid have a particle size such that more than 90% of the particles have a size of between 50 μm and 600 μm, more preferentially a particle size such that more than 90% of the particles have a size of between 80 μm and 400 μm, even more preferentially a particle size such that more than 90% of the particles have a size of between 100 μm and 300 μm, and even more preferentially a particle size such that more than 95% of the particles have a size of between 100 μm and 300 μm.

Preferably, the particles of the oxygen carrier solid have a grain density of between 500 $kg/m^3$ and 5000 $kg/m^3$, preferably a grain density of between 800 $kg/m^3$ and 4000 $kg/m^3$, and even more preferentially a grain density of between 1000 $kg/m^3$ and 3000 $kg/m^3$.

The particles of the oxygen carrier solid are preferably substantially spherical.

The size distribution and morphology of the particles for use in another type of chemical looping process (CLC, CLR, CLOU) in a fixed bed, in a moving bed or in a rotating reactor are suitable for the process envisaged. For example, in the case of a use of the oxygen carrier solid in a process using a fixed bed or rotating reactor technology, the preferred size of the particles is greater than 400 μm, in order to minimize the pressure drops in the reactor(s), and the morphology of the particles is not necessarily spherical. The morphology is dependent on the forming mode, for example in the form of extrudates, beads, monoliths or particles of any geometry obtained by grinding larger particles. In the case of a forming of monolithic type, the oxygen carrier solid, in the form of particles, is deposited on the surface of the ceramic monolith channels by means of coating methods known to those skilled in the art or else the monolith itself consists of the particles according to the invention.

The size of the particles may be measured by laser particle size analysis.

The particle size distribution of the oxygen carrier solid is preferably measured with a laser granulometer, for example a Malvern Mastersizer 3000®, preferably in liquid mode, and using the Fraunhofer theory.

Such a technique and such a material may also be used to measure the size of other grains such as the grains of precursor oxides of the ceramic matrix.

Producing oxygen carrier particles in the desired size range requires a forming step (see steps (B) and (F) described below) starting with smaller grains, the size of which is between 0.1 μm and 20 μm, preferentially between 0.5 μm and 5 μm, and more preferably between 1 μm and 3 μm. The forming may be performed according to any technique known to those skilled in the art which makes it possible to obtain particles, such as extrusion, compacting, wet or dry granulation, for example agglomeration on a granulating plate or a granulating drum, freeze granulation, or by drop (oil drop) coagulation techniques, and preferably by means of a technique of spray drying or agglomeration on a granulating plate or granulating drum, making it possible to obtain particles of spherical shape.

A step of sieving and/or screening (classification or separation using a cyclone, for example) may also be performed so as to select the particles of the desired particle size.

Preparation of the Oxygen Carrier Solid

The process for preparing the oxygen carrier includes several possible embodiments, which differ notably in the order of introduction of the elements copper and magnesium, as detailed in step (E).

The oxygen carrier solid may be prepared according to a process including the following steps:

Step (A): Preparation of a Suspension of Precursor Oxide(s) of a Ceramic Matrix

Step (A) involves the preparation of an aqueous suspension of alumina particles and an aluminous binder, said suspension having rheological features suitable for pumping and spraying. The alumina particles form grains with a size between 0.1 μm and 20 μm, preferably between 0.5 μm and 5 μm, and more preferably between 1 μm and 3 μm.

The alumina used may be chosen from transition aluminas, preferably from gamma, delta, theta and eta alumina.

The aluminum binder may be chosen from boehmite and/or aluminum hydroxides (bayerite, gibbsite or nordstrandite). It may be added in a proportion of from 5% to 30% by weight relative to the mass of aluminum oxide in suspension. The aluminum binder may be peptized with 1% to 10% by weight of an acid chosen from HCl, $H_2SO_4$ and $HNO_3$, preferentially $HNO_3$.

One or more organic and/or inorganic binders may be added to the suspension in order to adjust and control the rheology of the suspension and to ensure the cohesion of the particles that are obtained on conclusion of the forming step, before the consolidation by calcination in a subsequent step.

The organic binder(s) of varying molar mass may be selected from polyethylene glycol (PEG), polyvinyl alcohol (PVA), polyacrylate (PA), polyvinylpyrrolidone (PVP), etc. They may be added in an amount of from 0.5% to 6% by weight relative to the mass of oxide(s) in suspension.

One or more pore-forming agents intended to increase the macroporosity of the particles may also be added to the suspension. Preferably, when such agents are added to the solution, the amount thereof is preferably less than 25% by weight relative to the mass of oxide(s) in suspension. Such agents are typically organic compounds that can be burnt, such as starch, cellulose, polymers such as polypropylene, latex or poly(methyl methacrylate) (PMMA).

Step (B): Spray Drying

During this step, the suspension obtained in step (A) is dried by atomization: the suspension is sprayed as fine droplets into a drying chamber by spraying means, for example using a pneumatic (dual-fluid) or hydraulic (singlefluid) spraying nozzle, and these droplets are simultaneously placed in contact with a hot carrier gas, preferably air or nitrogen, raised to a temperature of between 180° C. and 350° C. The hot carrier gas may be introduced with a co-current stream (ceiling mode) or a mixed stream (fountain mode) allowing evaporation of the solvent and the production of spherical particles having the desired particle size.

This step advantageously enables the formation of particles having the desired particle size. Preferably, this step is performed so as to produce particles of the following particle size: more than 90% of the particles have a size between 50 and 600 μm, preferably more than 90% of the particles have a size between 80 μm and 400 μm, even more preferentially more than 90% of the particles have a size between 100 μm and 300 μm, and even more preferentially more than 95% of the particles have a size between 100 μm and 300 μm.

A subsequent optional screening step (D) may be performed so as to obtain the desired particle size, described below.

Step (C): Calcining of the Spray-Dried Particles

The particles resulting from the spray-drying in step (B) are calcined in air at a temperature of between 400° C. and 1400° C., preferentially between 600° C. and 1200° C., and very preferably between 650° C. and 950° C. This calcination step has an impact on the mechanical strength of the particles.

This calcination may be performed for a period of 1 to 24 hours, and preferably for a period of 3 to 6 hours.

It is possible to perform a temperature increase ramp of between 1° C./min and 50° C./min, and preferably between 5° C./min and 20° C./min, to reach the given calcination temperature, notably when the integration of copper and magnesium precursors into the oxygen carrier solid is performed according to step (E) (e3) described below. The time for implementing this temperature ramp is not included in the calcination time ranges indicated above.

If the incorporation of the Mg precursor, and possibly the Cu precursor, is performed before step (C), as described in step (E) (e3), the calcination in this step (C) is then preferably at a temperature of between 700° C. and 1400° C., preferably performed in air and more preferentially between 700° C. and 1000° C., even more preferentially between 750° C. and 950° C., even more preferentially between 800° C. and 950° C. or even between 900° C. and 950° C., in particular when the Cu precursor has been incorporated beforehand.

In the case of such an incorporation of precursor(s) before step (C) as described in step (E) (e3), the calcination is then preferably performed for a period of 5 hours to 15 hours. This calcination may then allow the formation of the first and/or the second sub-stoichiometric spinel.

Step (D): Optional Screening of the Particles

Screening may be performed on conclusion of the calcination step (C), directed toward selecting the particles in a desired size range. In particular, the screening may be performed so as to obtain particles with a size of between 50 μm and 600 μm, more preferentially between 80 μm and 400 μm, and even more preferentially between 100 μm and 300 μm.

The screening may be performed by separating the particles using a cyclone, or any other separation means.

Step (E): Integration of Cu and Mg

Step (E) includes either step (e1) followed by step (e2), or step (e3) where Cu and Mg are integrated before step (B), or step (e3) where only Mg is integrated before step (B) in combination with step (e2). Step (e1) allows Mg to be combined with alumina to produce the sub-stoichiometric spinel $Mg_aAl_bO_4$.

Step (e2) allows the Cu oxide to be combined with the sub-stoichiometric spinel obtained in step (e1) or alternatively obtained on conclusion of step (C) if step (e3) is performed.

Step (e3) allows the Mg, and possibly the Cu, to be combined as early as step (A) for preparing the aluminum oxide suspension. Step (e3) is combined with step (e2) if the Cu is not incorporated during step (e3).

Step (e1): Impregnation, Drying and Calcination of Alumina Particles in Order to Insert Mg According to this step (e1), the calcined particles obtained on conclusion of step (C), and optionally screened on conclusion of step (D), are (i) impregnated with an aqueous or organic solution containing at least one soluble Mg precursor compound.

Preferably the dry impregnation is performed with an aqueous solution containing hydrated magnesium nitrate. The concentration of soluble Mg precursor(s), for example hydrated Mg nitrate, in the impregnation solution is calculated so that Y is between 1% and 23%, with $Y<-0.6342X+26.223$, and with X between 5% and 39%.

The impregnated particles are then (ii) dried, for example in an oven, and preferably in air or under a controlled atmosphere (controlled relative humidity, under nitrogen). The term "controlled atmosphere" means, for example, with controlled relative humidity or under nitrogen. This drying is performed at a temperature of between 30° C. and 200° C.

More preferentially, this drying is performed in air at a temperature of between 100° C. and 150° C.

The impregnation may be performed in one or more successive steps.

If the impregnation is performed in several successive steps, an intermediate calcination step at a temperature of between 400° C. and 600° C. is preferably performed.

Finally, the impregnated and dried particles are then (iii) calcined. This second (or $n^{th}$ if the impregnation is performed several times) calcination step (the first being that of step (C)) results in the sub-stoichiometric spinel.

This calcination (iii) is performed between 700° C. and 1400° C., preferably in air, more preferentially between 700° C. and 1000° C., and even more preferentially between 750° C. and 950° C.

This calcination may be performed for a period of 1 to 24 hours, and preferably for a period of 3 to 6 hours.

Advantageously, a temperature increase ramp of between 1° C./min and 50° C./min, and preferably between 5° C./min and 20° C./min, is applied to achieve the given calcination temperature. The duration of this temperature ramp is not included in the calcination time ranges indicated above.

This calcination may allow the formation of the first sub-stoichiometric spinel.

Step (e2): Impregnation of the Sub-Stoichiometric Spinel in Order to Integrate Cu According to this step (e2), the calcined particles obtained on conclusion of step (e1) are (j) impregnated with an aqueous or organic solution containing at least one soluble copper precursor compound.

Alternatively, said impregnation (j) may be performed on the calcined particles obtained from step (C) or optionally screened particles obtained from step (D) in the case where step (e3) described below is performed, without Cu being incorporated during one of the sub-steps (k), (kk) and (kkk) of step (e3).

Preferably said impregnation is performed with an aqueous solution containing hydrated copper nitrate $Cu(NO_3)_2 \cdot xH_2O$. The concentration of soluble Cu precursor(s), for example hydrated Cu nitrate, of the aqueous solution is calculated so as to comply with the relationship $Y<-0.6342X+26.223$, with X between 5% and 39% and Y between 1% and 23%.

The impregnated particles are then (jj) dried, for example in an oven, and preferably in air or under a controlled atmosphere (controlled relative humidity, under nitrogen). This drying is performed at a temperature of between 30° C. and 200° C.

More preferentially, this drying is performed in air at a temperature of between 100° C. and 150° C.

Finally, the impregnated and dried particles are then (jjj) calcined. This third (or n th if the impregnation is performed several times, or second if step (e3)(kkk) is performed), calcination step (the first being that of step (C)) results in the oxygen carrier solid.

This calcination allows the formation of the first and/or the second sub-stoichiometric spinel.

The impregnation may be performed in one or more successive steps.

If the impregnation is performed in several successive steps, an intermediate calcination step at a temperature of between 400° C. and 600° C. is preferably performed.

This calcination (jjj) is performed between 700° C. and 1400° C., preferably in air, more preferentially between 700° C. and 1000° C., and even more preferentially between 800° C. and 950° C., or even between 900° C. and 950° C.

This calcination may be performed for a period of 1 to 24 hours, and preferably for a period of 5 to 15 hours.

Advantageously, a temperature increase ramp of between 1° C./min and 50° C./min, and preferably between 5° C./min and 20° C./min, is applied to achieve the given calcination temperature. The time for implementing this temperature ramp is not included in the calcination time ranges indicated above.

Step (e3): Addition of the Mg Precursor and Optionally the Cu Precursor Before Step (B)

According to step (e3), and as an alternative to that which is performed during the sequence of steps (e1) and (e2), the Mg and possibly Cu precursors are combined with the alumina matrix prior to the spray-drying step (B), before or after the preparation of the suspension in step (A), so as to form a suspension including the Mg precursor and optionally the Cu precursor.

The incorporation of the precursors may then be performed according to one of the following three sub-steps (k), (kk) or (kkk), and preferably according to sub-step (kkk):

(k) impregnating the alumina particles used for preparing the suspension in step (A) with at least one Mg precursor compound, and optionally with a Cu precursor compound. Said copper and magnesium precursor compounds are preferentially hydrated copper and magnesium nitrates. This sub-step (k) is performed before step (A): the impregnation is performed prior to placing the alumina particles in suspension. A drying step followed by a calcination step, as described in step (e1) (ii) and (iii), may be performed following this impregnation (k).

(kk) addition of at least one soluble Mg precursor, and optionally a soluble Cu precursor, to the suspension prepared in step (A). Advantageously, the soluble compound is a hydrated nitrate for the soluble Cu precursor and a hydrated copper nitrate for the soluble Mg precursor. This sub-step (kk) is thus performed after step (A) and before step (B).

(kkk) addition to the suspension prepared in step (A) of at least one oxide or hydroxide of Mg, and optionally an oxide or hydroxide of Cu. These compounds added to the suspension prepared in step (A) are solids in the form of grains, with a size of between 0.1 μm and 20 μm, preferably between 0.1 μm and 5 μm, and more preferably between 0.1 μm and 1 μm. This sub-step (kkk) is thus performed after step (A) and before step (B).

It is understood that step (e2) is necessarily performed in combination with step (e3) if no soluble Cu precursor compound or Cu oxide or hydroxide is added in sub-steps (k), (kk) and (kkk) in step (e3). This then allows the Cu to be incorporated by impregnation of the sub-stoichiometric spinel obtained on conclusion of step (C) when step (e3) is performed.

In step (e3), the concentration of Mg and/or Cu precursors is calculated as defined previously for steps (e1) and (e2).

Advantageously, performing step (e3) with the integration of both Cu and Mg makes it possible to simplify the process for preparing the oxygen carrier by dispensing with the impregnation steps (e1) and (e2).

The preparation of the oxygen carrier solid according to the invention may comprise the recycling, into step (E) (kkk), of fines of the oxygen carrier produced during its use in a chemical looping redox process such as CLC, for example by adding in step (kkk) to the suspension prepared in step (A) less than 10% by weight of fines relative to the total oxide content of the suspension. The recycled fines are generally less than 40 μm in size. A step of grinding the fines may thus be necessary to achieve a particle size distribution of the fines of between 0.1 μm and 20 μm, preferably between 0.5 μm and 5 μm, and more preferably between 1 μm and 3 μm.

Step (F): Forming the Particles Obtained From Step (E)—Optional

If the forming of the grains to the desired shape and particle size has not been performed on conclusion of step (B), the particles obtained from step (E) may be formed during this step (F) so as to obtain particles of the oxygen carrier having the desired form and particle size, as described previously.

In particular, the forming in this step may be performed to produce particles having a particle size such that more than 90% of the particles have a size between 50 μm and 600 μm, more preferably between 80 μm and 400 μm, and even more preferentially between 100 μm and 300 μm, and even more preferentially a particle size such that more than 95% of the particles have a size between 100 μm and 300 μm.

If a circulating fluidized bed implementation is envisaged in the chemical looping redox process using the oxygen carrier solid, the forming is preferably performed in such a way as to obtain a particle size distribution such that said particles belong to class A or class B of the Geldart classification, and more preferentially to class B.

The forming may be performed according to any technique known to those skilled in the art for obtaining particles, such as spray drying, wet or dry granulation, for example agglomeration on a granulating plate or granulating drum, freeze granulation, or by drop (oil drop) coagulation techniques, and preferably by means of a technique of spray drying or agglomeration on a granulating plate or granulating drum, which make it possible to obtain spherical particles, in particular having the specific particle size mentioned above.

The forming may also be performed according to other techniques such as extrusion or compaction, known to those skilled in the art, making it possible, for example, to obtain particles often of larger size, for example non-spherical particles, which can be used in a fixed or mobile bed.

The forming may optionally comprise a screening and/or cycloning step, in order to obtain agglomerates of the desired particle size.

Use of the Oxygen Carrier Solid

The oxygen carrier solid is intended to be used in a chemical looping redox process.

The invention thus relates to a chemical looping redox process using the oxygen carrier solid as described, or prepared according to the preparation process as described.

Advantageously, the oxygen carrier solid described is used in a CLC process of a hydrocarbon feedstock, in which the oxygen carrier solid is in the form of particles and circulates between at least one reduction zone and one oxidation zone both operating in a fluidized bed.

The temperature in the reduction zone and in the oxidation zone is between 600° C. and 1200° C., preferably between 750° C. and 1100° C., and even more preferentially between 800° C. and 1100° C.

The treated hydrocarbon feedstock may be a solid, liquid or gaseous hydrocarbon feedstock: gaseous fuels (for example: natural gas, syngas, biogas), liquid fuels (for example: fuel oil, bitumen, diesel, gasolines, etc.), or solid fuels (for example: coal, coke, petcoke, biomass, oil sands, etc.).

The operating principle of the CLC process in which the oxygen carrier solid described is used is as follows: a reduced oxygen carrier solid is placed in contact with a stream of air, or any other oxidizing gas, in a reaction zone referred to as an air reactor (or oxidation reactor). This results in a depleted air stream and a stream of reoxidized particles of the oxygen carrier solid. The stream of oxidized oxygen carrier particles is transferred into a reduction zone referred to as a fuel reactor (or reduction reactor). The particle stream is placed in contact with a fuel, typically a hydrocarbon feedstock. This results in a combustion effluent and a stream of reduced oxygen carrier particles. The CLC facility may include various items of equipment, for heat exchange, pressurization, separation or possible recirculations of material around the air and fuel reactors.

In the reduction zone, the hydrocarbon feedstock is placed in contact, preferably co-currentwise, with the oxygen carrier solid in the form of particles to perform the combustion of said feedstock by reduction of the oxygen carrier. The oxygen carrier is reduced by means of the hydrocarbon feedstock, which is correspondingly oxidized to $CO_2$ and $H_2O$, or possibly to a $CO+H_2$ mixture depending on the proportions of oxygen carrier and hydrocarbon feedstock used. The combustion of the feedstock in contact with the active mass is performed at a temperature generally between 600° C. and 1200° C., preferentially between 600° C. and 1100° C., and more preferentially between 800° C. and 1100° C. The contact time varies depending on the type of combustible feedstock used. It typically ranges between 1 second and 10 minutes, for example preferably between 1 and 5 minutes for a solid or liquid feedstock, and for example preferably from 1 to 20 seconds for a gaseous feedstock.

A mixture comprising the gases from the combustion and the particles of the oxygen carrier solid is discharged, typically at the top of the reduction zone. Gas/solid separation means, such as a cyclone, make it possible to separate the combustion gases from the solid particles of the oxygen carrier in their most reduced state. The latter are sent to the oxidation zone to be re-oxidized, at a temperature generally between 600° C. and 1200° C., preferentially between 600° C. and 1100° C., and more preferentially between 800° C. and 1100° C.

In the oxidation reactor, the oxygen carrier is restored to its oxidized state on contact with air, before returning to the reduction zone, and after having been separated from the oxygen-depleted air discharged at the top of the oxidation zone.

The oxygen carrier solid, passing alternately from its oxidized form to its reduced form and vice versa, describes a redox cycle.

The oxygen carrier solid described may also be used in another chemical looping redox process such as a CLR process or a CLOU process.

The technology used in the chemical looping redox process is preferably that of the circulating fluidized bed, but is not limited to this technology, and may be extended to other technologies such as the fixed bed, moving bed or ebullated bed technology, or alternatively the rotating reactor technology.

EXAMPLES

The advantage of the oxygen carrier solids according to the invention in the chemical looping processes, in particular CLC, in particular the minimization of the migration of the active mass within the particles during the redox cycles, is disclosed through the examples 1 to 6 below.

Example 2 relates to an oxygen carrier solid not in accordance with the invention. Examples 3 to 6 relate to oxygen carrier solids in accordance with the invention.

When reference is made in the examples below to figures representing X-ray diffractograms, the x-axis A corresponds to the angle 20 (in degrees) and the y-axis Cps represents the number of counts during the measurement.

The diffraction diagrams (diffractograms) are obtained by radiocrystallographic analysis by means of a diffractometer using the conventional powder method with the $K\alpha 1$ radiation of copper ($\lambda$=1.5406 Å).

On the basis of the position of the diffraction peaks represented by the angle $2\theta$, the lattice constant distances $d_{hkl}$ characteristic of the sample are calculated using the Bragg relationship. The measurement error $\Delta(d_{hkl})$ on $d_{hkl}$ is calculated by virtue of the Bragg relationship as a function of the absolute error $\Delta(2\theta)$ assigned to the measurement of $2\theta$. An absolute error $\Delta(2\theta)$ equal to ±0.02° is commonly accepted.

The spinel formulae given in the examples below are theoretical formulae calculated from the contents of MgO, CuO and $Al_2O_3$.

The particle size distribution may be expressed below with the values for $D_{v10}$, $D_{v50}$ and $D_{v90}$. The diameter $D_{v10}$ is defined as being the diameter such that, among all the particles, all the particles smaller than this diameter constitute 10% of the volume of the particles. The diameter $D_{v90}$ is defined as being the diameter such that, among all the particles, all the particles smaller than this diameter constitute 90% of the volume of the particles. The diameter $D_{v50}$ is defined as being the median diameter such that, among all the particles, all the particles smaller than this diameter constitute 50% of the volume of the particles.

The particle size is determined by laser particle size analysis (Malvern Mastersizer 3000®, preferably in liquid mode, and using the Fraunhofer theory).

The term "specific surface area of a particle" (alumina or oxygen carrier) means the BET specific surface area determined by nitrogen adsorption in accordance with the standard ASTM D 3663-78 established from the Brunauer-Emmett-Teller method described in the journal The Journal of the American Chemical Society, 60, 309 (1938).

In the present application, the term "to comprise" is synonymous with (means the same thing as) "to include" and "to contain", and is inclusive or open and does not exclude other elements not stated. It is understood that the term "comprise" includes the exclusive and closed term "consist".

Example 1: Aging Test for Oxygen Carrier Solids in a Batch Fluidized Bed

Aging of oxygen carrier solids in a fluidized bed as described below was performed in a unit (as described in H. Stainton et al., Fuel (2012) 101, 205-214) consisting of a quartz reactor, an automated system for feeding gas to the reactor and a system for analyzing the gases leaving the reactor. This is a fluidized bed process, referred to as a "batch" process.

This aging test approximates the conditions of use of the oxygen carrier solid in a chemical looping redox process, in particular a chemical looping combustion redox process.

The gases ($CH_4$, $CO_2$, $N_2$, air) are distributed by mass flow meters. For safety reasons, flushing with nitrogen is performed after each reduction and oxidation period.

The height of the quartz reactor is 30 cm, with a diameter of 4 cm in its lower part (over a height of 24 cm), and of 7 cm in its upper part. A quartz sinter is placed at the bottom of the reactor to ensure the distribution of the gases and good fluidization of the particles. Another sinter is placed in the upper part of the reactor to prevent the loss of fines during the test. The reactor is heated using an electric furnace.

Some of the gas leaving the reactor is pumped to the gas analyzers, cooled to condense the majority of the water formed during the reduction and then dried with calcium chloride. The gas concentrations are measured using non-dispersive infrared analyzers for CO, $CO_2$ and $CH_4$, a paramagnetic analyzer for oxygen, and a TCD detector for hydrogen.

Standard test conditions: 100 grams of particles are introduced into the quartz reactor and then heated to 900° C. in a stream of air (60 Nl/h). When the temperature of the bed is stabilized at 900° C. in air, 250 cycles are performed according to the following steps:

1—Nitrogen flushing (60 Nl/h)

2—Injection of a $CH_4/CO_2$ mixture (30 Nl/h/30 Nl/h) (particle reduction)

3—Nitrogen flushing (60 Nl/h)

4—Injection of air (60 Nl/h) (particle oxidation).

The conversion of the oxygen carrier solid (amount of oxygen supplied by the oxygen carrier solid to achieve methane conversion, expressed as a weight percentage of the oxidized oxygen carrier) is calculated from the gas conversion data, and the reduction time (cycle step 2) is adjusted after the first cycle so that the oxygen carrier solid releases about 2% by weight of oxygen (relative to the oxidized mass of oxygen carrier solid introduced) on each reduction cycle. The oxidation time (step 4 of the cycle) is sufficient to completely reoxidize the particles (15 min).

The particle size distribution was measured with a Malvern particle size analyzer, using Fraunhofer theory.

The mercury porosimetry measurements were performed on an Autopore IV machine sold by Micromeritics, taking into account a mercury surface tension of 485 dynes/cm and a contact angle of 140°.

The minimum pore size that can be measured by mercury porosimetry is 3.65 nm.

The nitrogen adsorption isotherms were performed on the ASAP 2420 machine sold by Micromeritics.

Example 2: Carrier Solid Containing CuO (13% by Weight)/Stoichiometric $MgAl_2O_4$ (87% by Weight), Y=24.6% by Weight (Non-Compliant)

According to this Example 2, an oxygen carrier solid is formed by adding 13% by weight of CuO to a stoichiometric $MgAl_2O_4$ spinel.

The contents of CuO, MgO and $Al_2O_3$ are such during the preparation that a stoichiometric spinel is formed.

In this Example 2, the particles of the oxygen carrier solid are prepared by dry impregnation of copper nitrate on a stoichiometric $MgAl_2O_4$ spinel. The stoichiometric spinel is prepared by two successive dry impregnations of magnesium nitrate on alumina particles. The alumina used for this example is a powder obtained from an aqueous suspension of alumina by means of the spray-drying process, as described above in the detailed description of the preparation of the oxygen carrier solid. It was prepared as follows:

An aqueous suspension composed of 75% by weight of deionized water, 15.8% by weight of gamma alumina grains, 4.01% by weight of boehmite grains, 3.23% by weight of polyvinyl alcohol binder (PVA with M~4000 g/mol, humidity 80% by weight), and 1.96% by weight of nitric acid ($HNO_3$ concentrated to 68% by weight) is pumped to a spray dryer, where it is sprayed as fine droplets which, during the phase of drying and of evaporation of the water, will form spherical solid particles with a size close to 100 μm.

The particle size distribution of the gamma alumina used indicates $D_{v10}$=1.0 μm, $D_{v50}$=2.8 μm and $D_{v90}$=6.6 μm. The pore size distribution is between 0 and 20 nm, centered on 9 nm, and the specific surface area measured by nitrogen physisorption according to the B.E.T. method is 206 $m^2/g$.

The particle size distribution of the boehmite used indicates $D_{v10}$=13.6 μm, $D_{v50}$32 74.5 μm and $D_{v90}$=166 μm.

The dry particles obtained form a powder, which is then calcined (step (C)) for 4 hours in a muffle furnace at a temperature of 700° C. and then screened (step (D)) between 125 μm and 315 μm to remove the finest particles.

The size distribution of the particles (alumina support) on conclusion of the screening step is characterized by the following parameters: $D_{v10}$=100 μm, $D_{v50}$=159 μm and $D_{v90}$=246 μm. The pore volume measured by mercury porosimetry of said particles (alumina support) is 0.636 ml/g, and a bimodal pore size distribution is observed. The pore size distribution for the mesoporosity is between 6 and 50 nm (centered on 10.8 nm) and for the macroporosity is between 50 and 500 nm (centered on 290 nm). The macropore volume is 0.25 ml/g, i.e. 39% of the total pore volume measured by mercury porosimetry.

200 g of alumina particles thus obtained are dry-impregnated a first time with 190 ml of a 700 g/l solution of magnesium nitrate ($Mg(NO_3)_2$) and then dried at 120° C. for 12 hours and calcined at 600° C. for 4 hours.

A second dry impregnation of these particles with the same solution is then performed, followed by drying at 120° C. and calcination at 800° C. for 4 hours. The theoretical composition of these particles is close to that of stoichiometric $MgAl_2O_4$.

Figure 2A:
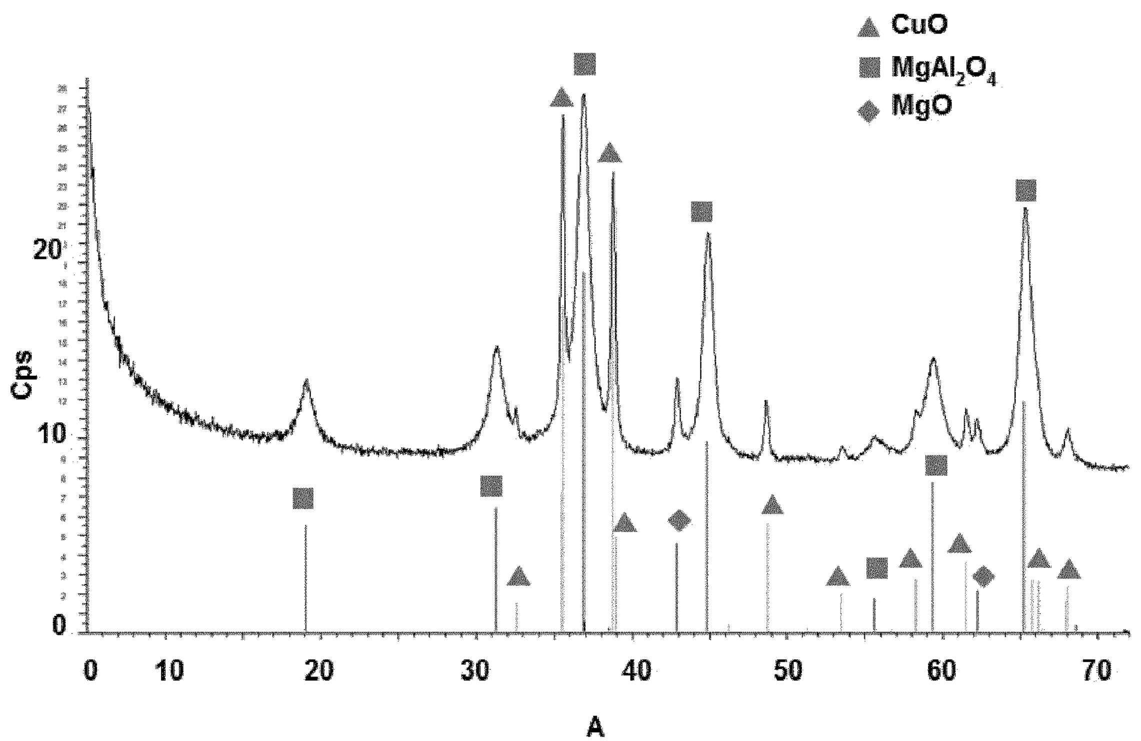
FIG. 2A is an X-ray diffraction (XRD) pattern of the oxygen carrier solid calcined at 800° C. prior to an aging test simulating its use in a CLC process.

A final step of dry impregnation with 117 ml of a solution containing 528 g/l of copper nitrate ($Cu(NO_3)_2$), followed by drying at 120° C. for 12 hours and then calcination at 800° C. for 4 hours, makes it possible to obtain particles containing about 13% by weight of CuO and about 87% by weight of $MgAl_2O_4$. The XRD analysis (FIG. 2A) shows that the particles are indeed composed of CuO (tenorite), $MgAl_2O_4$ and/or $CuAl_2O_4$ (the diffraction peaks are virtually superimposed for these two spinels) and the characteristic MgO peaks are also detected, indicating that some of the magnesium in the spinel has been exchanged for copper. A large proportion of copper is nonetheless in the CuO form, on the basis of the relative intensities of the diffraction peaks. In the X-ray diffractogram in FIG. 2A, the x-axis A corresponds to the angle 2θ (in degrees) and the y-axis Cps represents the number of counts in the measurement.

Figure 2B:
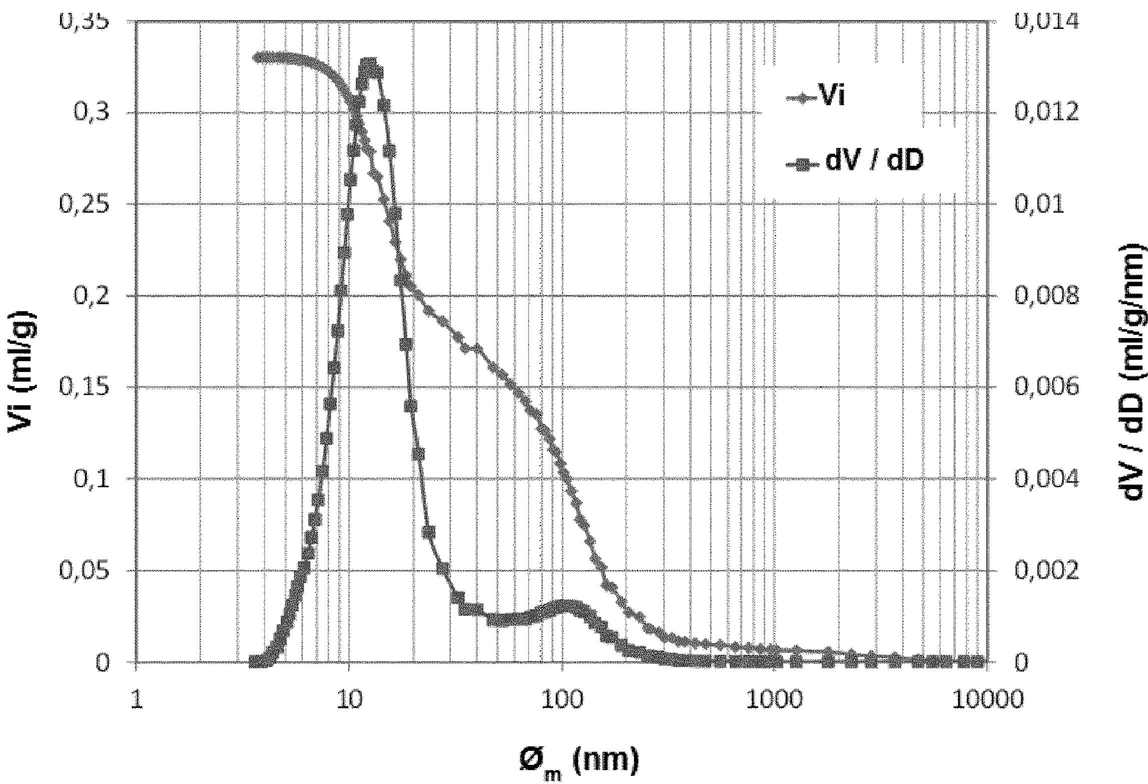
FIG. 2B is a diagram showing the pore size distribution of the oxygen carrier solid prior to its use in a CLC process.

The particle pore volume of the solid obtained, measured by mercury porosimetry, is 0.330 ml/g, of which 0.161 ml/g (i.e. 48.8% of the total pore volume measured by mercury porosimetry) is due to the macroporosity. The mesopore size distribution is between 4 and 50 nm and centered on 12.55 nm, as may be seen in the diagram in FIG. 2B showing the volume of mercury injected Vi (ml/g) into the porosity as a function of the pore diameter (nm), along with the ratio dV/dD (derived from (volume of Hg introduced/pore size), giving information regarding the pore size distribution for the oxygen carrier solid in this example. The macropore size distribution is greater than 50 nm and less than or equal to 2.8 μm and centered at 127 nm, as may be seen in the diagram in FIG. 2B. The particles are thus both mesoporous and macroporous.

The nitrogen adsorption isotherm of the oxygen carrier solid according to this example makes it possible to measure a specific surface area of 60 $m^2$/g, a micropore volume (pores<2 nm) of zero and a mesopore volume (2 nm<pores and 50 nm) of 0.223 ml/g.

The oxygen carrier solid according to this example was aged under the conditions described in Example 1.

Figure 2C:
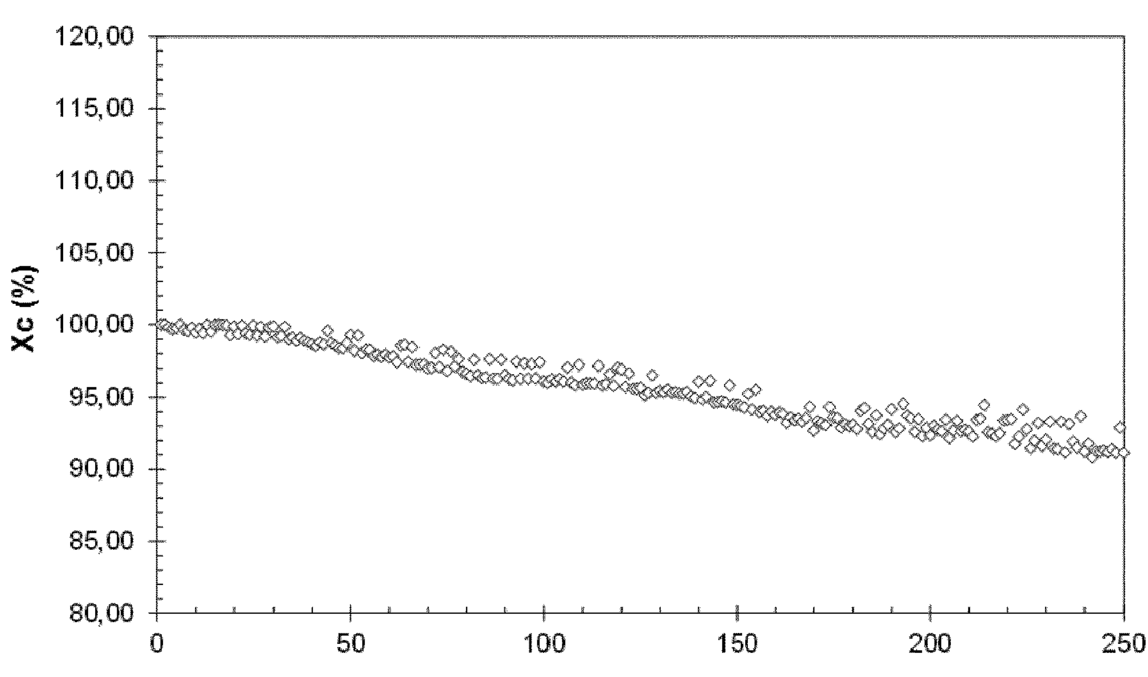
FIG. 2C is a diagram showing the conversion of methane as a function of the redox cycles in a CLC process using the oxygen carrier solid.

FIG. 2C is a diagram showing the normalized methane conversion rate Xc as a function of the number N of redox cycles in a CLC process using the oxygen carrier solid of Example 2. The methane conversion is 100% at the start of the test and gradually decreases to about 91% after 250 cycles.

Figure 2D:
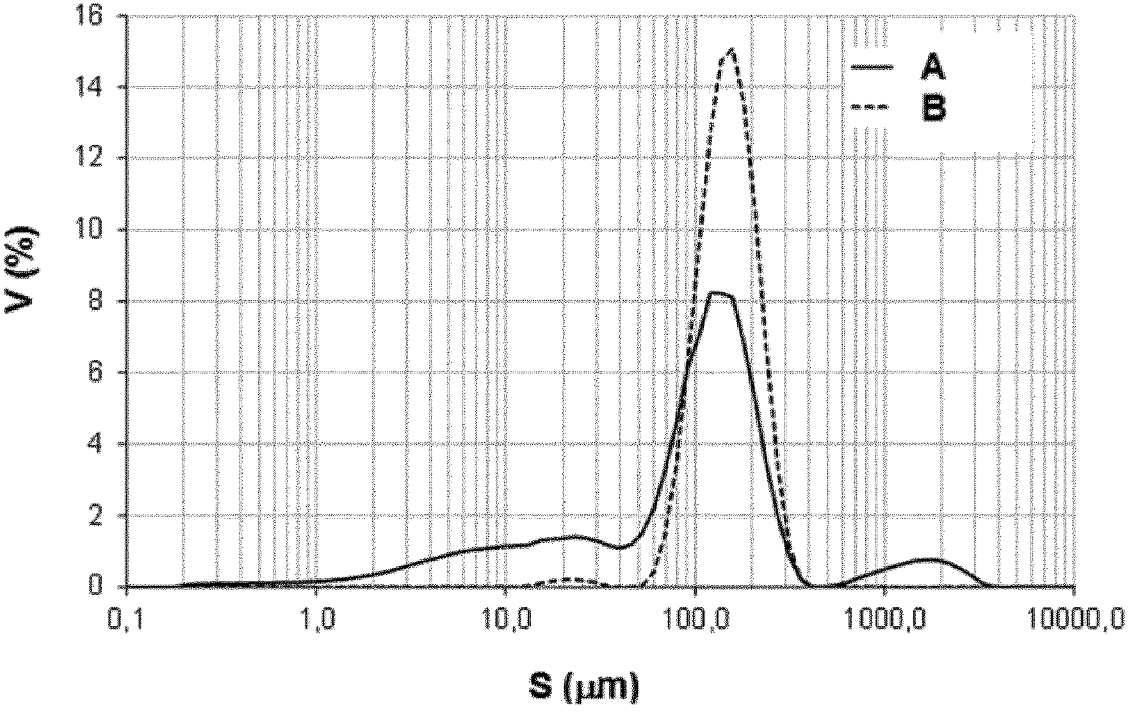
FIG. 2D is a diagram showing the particle size distribution of the oxygen carrier solid before (A) and after (B) an aging test simulating its use in a CLC process.

FIG. 2D shows the particle size distribution of the oxygen carrier solid according to Example 2 before (dashed curve B) and after (solid curve A) its use in a CLC process. The volume V (in %) is given on the y-axis and the particle size S (in μm) is given on the x-axis. Comparison of the particle size distributions of the oxygen carrier solid before and after its use in a CLC process shows that a large proportion of fine particles appeared during the test, and that large agglomerates formed.

An XRD analysis of the carrier particles after testing (not shown in the figures) indicates that only the $MgAl_2O_4$ and/or $CuAl_2O_4$ (very highly crystalline) and CuO phases are present in the oxygen carrier solid.

Figure 2E:
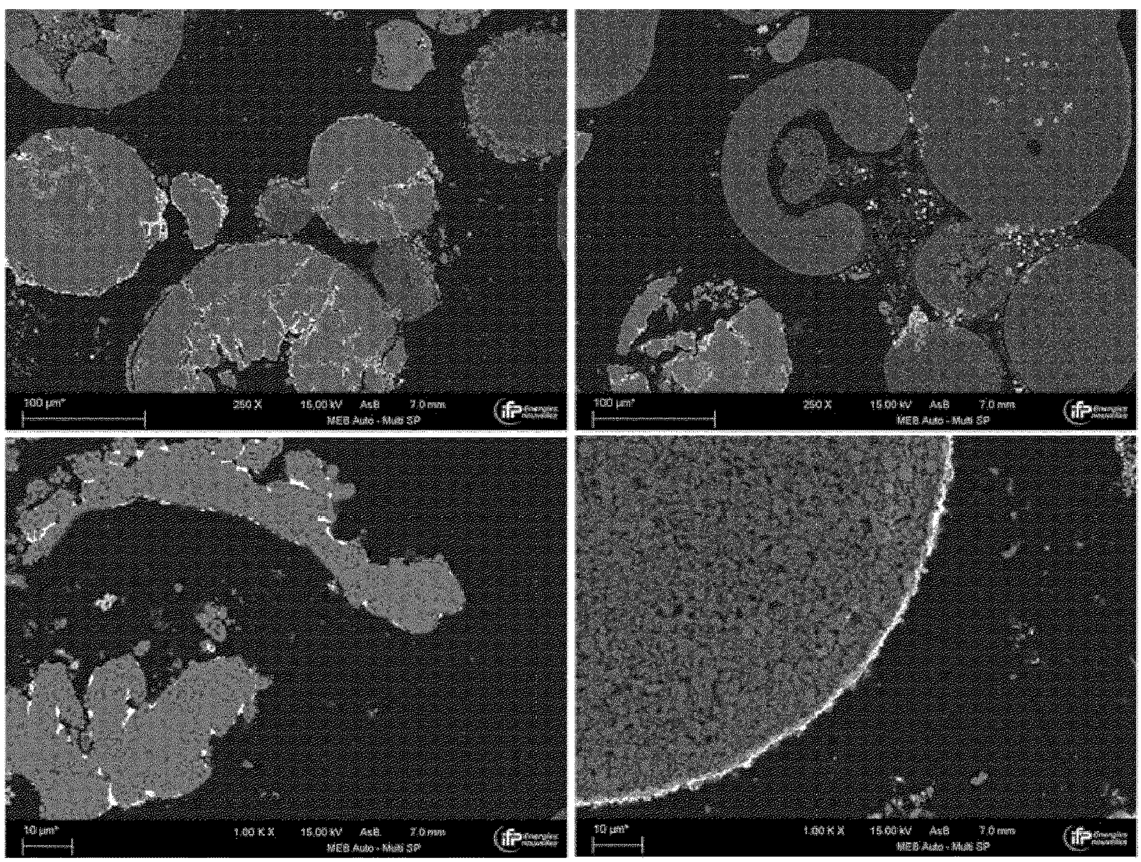
FIG. 2E is a set of SEM images of a polished section of a sample of the oxygen carrier solid after aging tests simulating its use in a CLC process.

SEM (scanning electron microscopy) backscattered electron images on the polished section of the particles after testing, shown in FIG. 2E (top two images at x250 magnification and bottom two images at ×1000 magnification), show that copper (bright white) is predominantly located at the periphery of the particles and in the large cracks which appeared during the redox cycles. Copper is also present in large amounts in the phase which serves as binder between the particles forming the agglomerates detected by laser granulometry. Numerous fragments of oxygen carrier particles are also observed in the sample, in accordance with the particle size analysis.

Example 2 shows that an oxygen carrier consisting of 13% CuO and 87% $MgAl_2O_4$ stoichiometric ceramic spinel matrix does not have a sufficient lifetime in a chemical looping combustion process.

Example 3: Carrier Solid Containing CuO (13% by Weight)/Sub-Stoichiometric $Mg_{0.48}Al_{2.34}O_4$ (87% by Weight), Y=12.2% by Weight, Calcined at 800° C. (Compliant)

According to this Example 3, an oxygen carrier solid is formed by adding 13% by weight of CuO to a sub-stoichiometric $Mg_{0.48}Al_{2.34}O_4$ spinel.

The oxygen carrier is prepared by impregnating magnesium nitrate and then impregnating copper nitrate onto the same macroporous alumina particles as in Example 2.

200 g of alumina particles from the same batch as that prepared for Example 2 are dry-impregnated with 180 ml of a solution containing 610 g/l of magnesium nitrate ($Mg(NO_3)_2$), dried at 120° C. for 12 hours and then calcined at 800° C. for 4 hours. The particles obtained are always spherical, and are mainly composed of a sub-stoichiometric spinel of theoretical composition $$Mg_{0.48}Al_{2.34}O_4.$$

A step of dry impregnation with 178 ml of a solution containing 375 g/l of copper nitrate ($Cu(NO_3)_2$), followed by drying at 120° C. for 12 hours and then calcination at 800° C. for 4 hours makes it possible to obtain particles containing about 13% by weight of CuO and about 87% by weight of $Mg_{0.48}Al_{2.34}O_4$.

The XRD analysis shows (FIG. 3A) that the particles do indeed consist of CuO, along with a spinel of the $MgAl_2O_4$ and/or $CuAl_2O_4$ type, sub-stoichiometric in Mg and/or Cu. Indeed, among the typical diffraction peaks of the spinel structure, the "$P_3$" peak in the 440 plane of the sample (at A=65.7° 2θ) lies between that of gamma alumina (at A=67.03° 2θ) and that of $CuAl_2O_4$ (at A=65.29° 2θ) and $MgAl_2O_4$ (at A=65.23° 2θ), which means that some of the available tetrahedral and octahedral sites available in the spinel structure are not filled. It is noteworthy that, as a result of similar cationic radii (72 pm for $Mg^{2+}$, 73 pm for $Cu^{2+}$), the $CuAl_2O_4$ and $MgAl_2O_4$ spinels have virtually superposable X-ray diffractograms, making it difficult to distinguish between the two structures.

The pore volume measured by mercury porosimetry of the alumina support is 0.505 ml/g, and a bimodal pore size distribution is observed. The pore size distribution for mesoporosity is between 5 and 50 nm (centered on 12 nm) and for macroporosity is greater than 50 nm and less than or equal to 500 nm (centered on 300 nm). The macropore volume is 0.237 ml/g, i.e. 47% of the total pore volume measured by mercury porosimetry.

The oxygen carrier solid according to this example was aged under the conditions described in Example 1.

FIG. 3B is a diagram showing the normalized methane conversion rate Xc as a function of the number N of redox cycles in a CLC process using the oxygen carrier solid of Example 3. The methane conversion is about 100% at the start of the test and remains stable over the 250 cycles of the test.

The presence of oxygen during the step of flushing with nitrogen after oxidation is observed. The particles may thus be used either in a CLC or CLOU process.

FIG. 3C shows the particle size distribution of the oxygen carrier solid according to Example 3 before (large dashed curve C) and after (small dashed curve D) its use in a CLC process. The volume V (in %) is given on the y-axis and the particle size S (in μm) is given on the x-axis. Comparison of the particle size distributions of the oxygen carrier solid before and after its use in a CLC process shows that the particle size distributions before and after testing are virtually identical.

The SEM images in the polished section of the particles after testing, shown in FIG. 3D (left-hand image at x250 magnification and right-hand image at x2500 magnification), show the absence of CuO nodules in the particles. Unlike the particles according to patent FR 3061036, the copper did not form copper oxide nodules in the porosity of the particles, and the distribution of copper in the particles is substantially improved, despite a slight over-concentration at the periphery of the particles.

Example 4: Carrier Solid Containing CuO (13% by Weight)/Sub-Stoichiometric $Mg_{0.239}Al_{2.507}O_4$ (87% by Weight), Y=6.09% by Weight, Calcined at 900° C. (Compliant), Forming a Sub-Stoichiometric $Cu_{0.243}Mg_{0.224}Al_{2.355}O_4$ Spinel According to this Example 4, an oxygen carrier solid is formed by successive impregnations of $Mg(NO_3)_2$ and $Cu(NO_3)_2$ on alumina particles between 100 μm and 300 μm in size obtained by atomization of an aqueous alumina suspension by means of the spray drying process, as described above in the detailed description of preparation of the oxygen carrier solid. The alumina suspension was prepared in the following manner:

An aqueous suspension composed of 69.8% by weight of deionized water, 26.1% by weight of gamma alumina grains, 3.9% by weight of boehmite grains and 0.2% by weight of nitric acid ($HNO_3$ concentrated to 68% by weight) is prepared (step A) and then pumped to a spray dryer, where it is sprayed as fine droplets which, during the phase of drying and of evaporation of the water, will form spherical solid particles larger than 100 μm (step B).

The particle size distribution of the gamma alumina used in the preparation of the aqueous suspension indicates $D_{v10}$=1.56 μm, $D_{v50}$=3.73 μm and $D_{v90}$=7.47 μm. The specific surface area measured by nitrogen physisorption according to the B.E.T. method is 291 $m^2/g$.

The particle size distribution of the boehmite used indicates $D_{v10}$=13.6 μm, $D_{v50}$=74.5 μm and $D_{v90}$=166 μm.

The dry particles obtained form a powder, which is then calcined (step (C)) for 4 hours in a muffle furnace at a temperature of 700° C. for 4 hours, and then screened (step (D)) between 125 μm and 315 μm to remove the finest particles.

The size distribution of the particles (alumina support) on conclusion of the screening step is characterized by the following parameters: $D_{v10}$=118 μm, $D_{v50}$=182 μm and $D_{v90}$=268 μm. The pore volume measured by mercury porosimetry of said particles (alumina support) is 0.893 ml/g, and a bimodal pore size distribution is observed. The pore size distribution for mesoporosity is between 4 and 50 nm (centered on 8.85 nm) and for macroporosity is greater than 50 nm and less than or equal to 1200 nm (centered on 640 nm). The macropore volume is 0.562 ml/g, i.e. 62.9% of the total pore volume measured by mercury porosimetry.

The alumina particles are then dry-impregnated with a magnesium nitrate solution, dried at 120° C. for 12 hours and calcined at 800° C. for 4 hours (step e1). The amount of magnesium nitrate used for the dry impregnation is calculated so as to obtain a sub-stoichiometric $Mg_{0.239}Al_{2.507}O_4$ spinel on conclusion of step (e1), i.e. a content of 7% MgO expressed as a weight percentage of the $Mg_{0.239}Al_{2.508}O_4$ spinel. Thus, 200 g of alumina particles are dry-impregnated with 180 ml of a solution containing 640 g/l of magnesium nitrate ($Mg(NO_3)_2$).

The sub-stoichiometric $Mg_{0.239}Al_{2.508}O_4$ spinel particles are then dry-impregnated with a copper nitrate solution, dried at 120° C. for 12 hours, and calcined at 900° C. for 12 hours (step e2). The amount of copper nitrate used for the dry impregnation is calculated so as to obtain a sub-stoichiometric $Cu_{0.243}Mg_{0.224}Al_{2.355}O_4$ spinel, i.e. contents of 13% by weight of CuO and 6.09% by weight of MgO expressed as weight percentage of the oxygen carrier. Thus, particles of the sub-stoichiometric $Mg_{0.239}Al_{2.508}O_4$ spinel are impregnated with 117 ml of a solution containing 528 g/l of copper nitrate ($Cu(NO_3)_2$).

The XRD analysis, presented in FIG. 4A, shows that the particles consist essentially of a spinel sub-stoichiometric in Cu and Mg, along with traces of copper oxide and alpha alumina. The "P 4" diffraction peak in the 440 plane of the spinel (at A=65.7° 2θ) lies between those of the gamma alumina and the $CuAl_2O_4$ and $MgAl_2O_4$ spinels, confirming the sub-stoichiometric aspect of said spinel formed. The low intensity of the alpha alumina and CuO peaks makes it possible to conclude that a sub-stoichiometric spinel having a formula close to $Cu_{0.24}Mg_{0.22}Al_{2.35}O_4$ is obtained.

The particle size distribution of the oxygen carrier solid indicates $D_{v10}$=128 μm, $D_{v50}$=190 μm and $D_{v90}$=273 μm. The pore volume measured by mercury porosimetry of the alumina support is 0.685 ml/g, and a bimodal pore size distribution is observed. The pore size distribution for mesoporosity is between 5 nm and 50 nm (centered on 14.8 nm) and for macroporosity is greater than 50 nm and less than or equal to 960 nm (centered on 600 nm). The macropore volume is 0.442 ml/g, i.e. 64.5% of the total pore volume measured by mercury porosimetry.

The oxygen carrier solid according to this example was aged under the conditions described in example 1.

FIG. 4B is a diagram showing the normalized methane conversion rate Xc as a function of the number N of redox cycles in a CLC process using the oxygen carrier solid according to Example 4. The methane conversion is about 100% at the start of the test and decreases very slightly to reach about 99.3% after 250 cycles.

The presence of oxygen during the step of flushing with nitrogen is observed. The particles may thus be used either in a CLC or CLOU process.

FIG. 4C makes it possible to compare the particle size distributions of the oxygen carrier solid before (black curve E) and after (gray curve F) its use in a CLC process: the particle size distributions before and after testing are virtually identical. The formation of a small amount of fine particles is, however, observed.

The SEM backscattered electron images on the polished section of the particles after testing, visible in FIG. 4D (1 image on the left at ×250 magnification and 1 image on the right at ×1000 magnification), show that unlike the particles according to patent FR 3061036, the copper did not form copper oxide nodules in the porosity of the particles, and the distribution of copper in the particles is particularly improved, with a slight over-concentration at the periphery of some particles.

This Example 4 shows that after aging of the oxygen carrier initially comprising a sub-stoichiometric spinel of formula close to $Cu_{0.24}Mg_{0.22}Al_{2.35}O_4$, the copper is uniformly distributed in the particles of the oxygen carrier solid. The copper did not form copper oxide nodules in the porosity of the particles, and the distribution of copper in the particles is substantially improved, despite a slight over-concentration at the periphery of the particles.

Example 5: Carrier Solid Containing CuO (13% by Weight)/Sub-Stoichiometric $MgAl_{2.345}O_4$ (87% by Weight), Y=12.18% by Weight, Calcined at 900° C., Forming a Sub-Stoichiometric $Cu_{0.245}Mg_{0.453}Al_{2.201}O_4$ Spinel (Compliant)

According to this Example 5, an oxygen carrier solid is formed by successive impregnations of $Mg(NO_3)_2$ and $Cu(NO_3)_2$ on the same alumina particles used in Example 4.

The alumina particles are dry-impregnated with a magnesium nitrate solution, dried at 120° C. for 12 hours and calcined at 800° C. for 4 hours (step e1). The amount of magnesium nitrate used for the dry 25 impregnation is calculated so as to obtain a sub-stoichiometric $Mg_{0.483}Al_{2.345}O_4$ spinel on conclusion of step (e1), i.e. a content of 14% MgO expressed as a weight percentage of the $Mg_{0.483}Al_{2.345}O_4$ spinel.

The sub-stoichiometric $Mg_{0.483}Al_{2.345}O_4$ spinel particles are then dry-impregnated with a copper nitrate solution, dried at 120° C. for 12 hours, and calcined at 900° C. for 12 hours (step e2). The amount of copper nitrate used for the dry impregnation is calculated so as to obtain a sub-stoichiometric $Cu_{0.245}Mg_{0.453}Al_{2.201}O_4$ spinel, i.e. contents of 13% by weight of CuO and 12.18% by weight of MgO expressed as weight percentage of the oxygen carrier solid.

The XRD analysis, presented in FIG. 5A, shows that the particles consist essentially of a spinel sub-stoichiometric in Cu and Mg, along with traces of copper oxide. The "$P_5$" diffraction peak in the 440 plane of the spinel (at A=65.5° 2θ) lies between those of the gamma alumina and the $CuAl_2O_4$ and $MgAl_2O_4$ spinels, confirming the sub-stoichiometric aspect of said spinel formed. The low intensity of the CuO peaks makes it possible to conclude that a sub-stoichiometric spinel with a formula close to $Cu_{0.24}Mg_{0.45}Al_{2.20}O_4$ is obtained.

The particle size distribution of the oxygen carrier solid indicates $D_{v10}$=132 μm, $D_{v50}$=192 μm and $D_{v90}$=272 μm. The pore volume measured by mercury porosimetry of the alumina support is 0.646 ml/g, and a bimodal pore size distribution is observed. The pore size distribution for mesoporosity is between 5 nm and 50 nm (centered on 14.6 nm) and for macroporosity is greater than 50 nm and less than or equal to 860 nm (centered on 600 nm). The macropore volume is 0.411 ml/g, i.e. 63.6% of the total pore volume measured by mercury porosimetry.

The oxygen carrier solid according to this example was aged under the conditions described in example 1.

FIG. 5B is a diagram showing the normalized methane conversion rate Xc as a function of the number N of redox cycles in a CLC process using the oxygen carrier solid of Example 5. The methane conversion is about 100% at the start of the test and decreases very slightly to reach about 99.8% after 250 cycles.

The presence of oxygen during the step of flushing with nitrogen is observed. The particles may thus be used either in a CLC or CLOU process. As in Example 4, a small amount of fines was formed during the test.

SEM images on the polished section of the particles after testing, visible in FIG. 5C (1 image on the left at ×250 magnification and 1 image on the right at ×1000 magnification), show that unlike the particles according to patent FR 3061036, the copper did not form copper oxide nodules in the porosity of the particles, and the distribution of copper in the particles is particularly improved, with a slight over-concentration at the periphery of some particles.

Example 6: Carrier Solid Containing CuO (11.15% by Weight) and 3.52% by Weight of MgO Contained in a Sub-Stoichiometric $Cu_{0.205}Mg_{0.3.28}Al_{2.445}O_4$ spinel-calcination at 900° C. (Compliant)

According to this Example 6, an oxygen carrier solid is formed according to the described method including step (e3) (kk), by incorporating Mg and Cu during the preparation of the particles by atomization.

An aqueous suspension composed of 42.6% by weight of deionized water, 20.2% by weight of gamma alumina grains, 17.0% by weight of copper nitrate ($CuNO_3$ concentrated to 43.69% by weight), 17.0% by weight of magnesium nitrate ($MgNO_3$ concentrated to 17.25% by weight), 3.1% by weight of boehmite grains, and 0, 1% by weight of nitric acid ($HNO_3$ concentrated to 68% by weight) is pumped to a spray dryer, where it is sprayed as fine droplets which, during the phase of drying and of evaporation of the water, will form spherical solid particles with a size close to 100 μm.

The particle size distribution of the gamma alumina used (the same as in Example 5) indicates $D_{v10}$=1.56 μm, $D_{v50}$=3.73 μm and $D_{v90}$=7.47 μm. The particle size distribution of the boehmite used indicates $D_{v10}$=13.6 μm, $D_{v50}$=74.5 μm and $D_{v90}$=166 μm.

The dried particles are then calcined at 900° C. for 12 hours.

The XRD analysis, presented in FIG. 6A, shows that the particles consist essentially of a spinel sub-stoichiometric in Cu and Mg, along with traces of alpha alumina. The "$P_6$" diffraction peak of the 440 plane of the spinel (at A=66.2° 2θ) lies between those of the gamma alumina and the $CuAl_2O_4$ and $MgAl_2O_4$ spinels, confirming the sub-stoichiometric aspect of said spinel formed. The low intensity of the alpha alumina peaks makes it possible to conclude that a sub-stoichiometric spinel with a formula close to $Cu_{0.21}Mg_{0.12}Al_{2.45}O_4$ is obtained.

The particle size distribution of the oxygen carrier solid indicates $D_{v10}$=69 μm, $D_{v50}$=122 μm and $D_{v90}$=199 μm. The pore volume measured by mercury porosimetry of the alumina support is 0.660 ml/g, and a bimodal pore size distribution is observed. The pore size distribution for mesoporosity is between 6 nm and 50 nm (centered on 10.8 nm) and for macroporosity is greater than 50 nm and less than or equal to 1500 nm (centered on 660 nm). The macropore volume is 0.511 ml/g, i.e. 77.4% of the total pore volume measured by mercury porosimetry.

The oxygen carrier solid according to this example was aged under the conditions described in example 1.

FIG. 6B is a diagram showing the normalized methane conversion rate Xc as a function of the number N of redox cycles in a CLC process using the oxygen carrier solid of Example 6. The methane conversion is about 100% at the start of the test and decreases very slightly to reach about 97.9% after 250 cycles.

The presence of oxygen during the step of flushing with nitrogen is observed. The particles may thus be used either in a CLC or CLOU process.

As in Examples 4 and 5, a small amount of fines was formed during the test. SEM images on the polished section of the particles after testing, visible in FIG. 6C (1 image on the left at ×250 magnification and 1 image on the right at ×1000 magnification), show that unlike the particles according to patent FR 3061036, the copper did not form copper oxide nodules in the porosity of the particles, and the distribution of copper in the particles is even better than in Examples 4 and 5, not showing any over-concentration at the periphery of the particles.

The invention claimed is:

1. An oxygen carrier solid in particulate form for a chemical looping redox process such as chemical looping combustion, including:

copper in a total content X of between 5% and 39% expressed as copper oxide by weight relative to the total weight of the oxygen carrier solid in its oxidized form;

a ceramic matrix within which said copper is dispersed, said ceramic matrix including:

a first sub-stoichiometric spinel of formula $Mg_aAl_bO_4$, and a second sub-stoichiometric spinel of formula $Cu_cMg_dAl_eO_4$, with:

$$a = \frac{4}{\left(1 + \left(3 \times \left(\frac{(100 - X)}{Y} - 1\right) \times \frac{M_{MgO}}{M_{Al_2O_3}}\right)\right)}$$

$$b = \frac{8 \times (100 - X - Y)}{\left(Y \times \frac{M_{Al_2O_3}}{M_{MgO}} + 3 \times (100 - X - Y)\right)}$$

$$c = \frac{4X}{M_{CuO} \times \left(\frac{X}{M_{CuO}} + \frac{Y}{M_{MgO}} + 3 \times \frac{100 - X - Y}{M_{Al_2O_3}}\right)}$$

$$d = \frac{4Y}{M_{MgO} * \left(\frac{X}{M_{CuO}} + \frac{Y}{M_{MgO}} + 3 \times \frac{100 - X - y}{M_{Al_2O_3}}\right)}$$

$$e = \frac{8 \times (100 - X - Y)}{M_{Al_2O_3} \times \left(\frac{X}{M_{CuO}} + \frac{Y}{M_{MgO}} + 3 \times \frac{100 - X - Y}{M_{Al_2O_3}}\right)}$$

$M_{MgO}$, $M_{CuO}$ and $M_{Al2O3}$ being the molar masses of MgO, CuO and $Al_2O_3$, respectively, Y being the amount of MgO as a weight percentage of the oxygen carrier solid, with X being between 5% and 39%, Y being between 1% and 23%, and $Y < -0.6342X + 26.223$, wherein the matrix comprises more than 95% by weight of the second spinel.

2. The solid as claimed in claim 1, in which the particles have a spherical shape, and a particle size such that more than 90% of the particles have a size of between 50 μm and 600 μm.

3. The solid as claimed in claim 1, also including:

a total pore volume of the oxygen carrier solid Vtot, measured by mercury porosimetry, of between 0.05 and 1.2 ml/g;

a pore volume of the macropores constituting at least 10% of Vtot;

a size distribution of macropores within the oxygen carrier solid, measured by mercury porosimetry, of greater than 50 nm and less than or equal to 7 μm.

4. The solid as claimed in claim 2, in which the particles have a particle size such that more than 90% of the particles have a size of between 80 μm and 400 μm.

5. The solid as claimed in claim 2, in which the particles have a particle size such that more than 90% of the particles have a size of between 100 μm and 300 μm.

6. A process for preparing the oxygen carrier solid as claimed in claim 1, comprising the following steps:

(A) preparing an aqueous suspension including alumina particles and an aluminic binder, said alumina particles forming grains with a size of between 0.1 μm and 20 μm;

(B) spray-drying the suspension obtained in step (A) to form particles, said spray-drying involving spraying the suspension into a drying chamber with spraying means to form droplets, and simultaneously placing said droplets in contact with a hot carrier gas heated to a temperature of between 180° C. and 350° C.;

(C) calcining the particles resulting from the spray-drying in step (B), said calcining being performed in air and at a temperature of between 400° C. and 1400° C.;

(D) optional screening of the calcined particles obtained from step (C);

(E) integrating Cu and Mg according to the sequence of steps (e1) and (e2), or according to step (e3), or according to steps (e3) and (e2) to produce the oxygen carrier solid in the form of particles:

(e1) (i) impregnating the calcined particles obtained from step (C) or optionally screened particles obtained from step (D) with an aqueous or organic solution containing at least one soluble Mg precursor compound, and then (ii) drying said impregnated particles obtained from (i) at a temperature of between 30° C. and 200° C., followed by (iii) calcination at a temperature of between 700° C. and 1400° C.;

(e2) (j) impregnating the calcined particles obtained from step (e1) or the calcined particles obtained from step (C) or optionally the screened particles obtained from step (D), with an aqueous or organic solution containing at least one soluble Cu precursor compound and then (jj) drying said impregnated particles obtained from (j) at a temperature of between 30° C. and 200° C. followed by (jjj) calcination at a temperature of between 700° C. and 1400° C.;

(e3) incorporating an Mg precursor and optionally a Cu precursor before step (B) according to one of the following sub-steps (k), (kk) or (kkk):

(k) before step (A), impregnating the alumina particles used for preparing the suspension in step (A) with an aqueous or organic solution containing at least one Mg precursor compound, and optionally a Cu precursor compound, optionally followed by drying the impregnated alumina particles at a temperature of between 30° C. and 200° C. and calcining the dried alumina particles at a temperature of between 700° C. and 1400° C.;

(kk) after step (A) and before step (B), adding at least one soluble Mg precursor, and optionally a soluble Cu precursor, to the suspension obtained from step (A);

(kkk) after step (A) and before step (B), adding to the suspension obtained from step (A) at least one Mg oxide, and optionally a Cu oxide, said oxide(s) being in the form of grains with a size of between 0.1 μm and 20 μm;

it being understood that step (e2) is necessarily performed in combination with step (e3) if no Cu precursor compound or soluble Cu precursor compound or Cu oxide is added during sub-steps (k), (kk) and (kkk) in step (e3).

7. The preparation process as claimed in claim 6, in which the calcination in step (C) and/or in step (e1)(iii) and/or in step (e2)(jj) and/or in step (e3)(k) is performed for a period of 1 to 24 hours.

8. The preparation process as claimed in claim 6, in which the calcination in step (C) and/or step (e1)(iii) and/or step (e2)(jj) and/or step (e3) (k) is performed according to a temperature increase ramp of between 1° C./min and 50° C./min to reach the given calcination temperature.

9. The preparation process as claimed in claim 6, in which the calcination in step (C) is performed in air at a temperature of between 800° C. and 950° C., the calcination in step (e1)(iii) and/or in step (e3)(k) is performed in air at a temperature of between 750° C. and 950° C., and the calcination in step (e2)(jjj) is performed in air at a temperature of between 900° C. and 950° C.

10. The preparation process as claimed in claim 6, in which the impregnation in step (e1)(i) and/or step (e3)(k) is performed dry with an aqueous solution including magnesium nitrate.

11. The preparation process as claimed in claim 6, in which the impregnation in step (e2)(j) is performed with an aqueous solution including copper nitrate.

12. The process as claimed in claim 6, in which, in step (e3)(kk), magnesium nitrate is added to the suspension obtained from step (A) as a soluble Mg precursor, and optionally copper nitrate is added as a soluble Cu precursor.

13. The preparation process as claimed in claim 1, in which the impregnation in at least one of the steps (e1)(i) or (e2)(j) is performed in several successive steps, and an intermediate calcination between two successive impregnation steps is performed at a temperature of between 400° C. and 600° C.

14. The preparation process as claimed in claim 6, in which the amounts of magnesium and copper precursors are calculated so that Y is between 1% and 23% and X is between 5% and 39%, with $Y<-0.6342X+26.223$, so as to form the first sub-stoichiometric spinel and the second sub-stoichiometric spinel.

15. The preparation process as claimed in claim 6, in which the integration of Cu and Mg is performed according to step (e3), and in which the calcination in step (C) is performed in air at a temperature of between 800° C. and 950° C. and for a time of from 1 to 24 hours.

16. A process for chemical looping redox combustion of a hydrocarbon feedstock using the oxygen carrier solid as claimed in claim 1, in which the oxygen carrier solid circulates between at least one reduction zone and one oxidation zone both operating in a fluidized bed, the temperature in the reduction zone and in the oxidation zone being between 600° C. and 1200° C.

* * * * *